United States Patent
Raileanu et al.

(10) Patent No.: US 10,924,408 B2
(45) Date of Patent: Feb. 16, 2021

(54) SYSTEM AND METHOD FOR OPTIMIZING TRAFFIC IN PACKET-SWITCHED NETWORKS WITH INTERNET EXCHANGES

(71) Applicants: Grigore Raileanu, Sunnyvale, CA (US); Maxim Basunov, Tiraspol (MD)

(72) Inventors: Grigore Raileanu, Sunnyvale, CA (US); Maxim Basunov, Tiraspol (MD)

(73) Assignee: Noction, Inc., Oakland, CA (US)

( * ) Notice: Subject to any disclaimer, the term of this patent is extended or adjusted under 35 U.S.C. 154(b) by 440 days.

(21) Appl. No.: 14/535,615

(22) Filed: Nov. 7, 2014

(65) Prior Publication Data

US 2016/0134542 A1    May 12, 2016

(51) Int. Cl.
*H04L 12/707* (2013.01)
*H04L 12/803* (2013.01)

(52) U.S. Cl.
CPC ............ *H04L 47/122* (2013.01); *H04L 45/22* (2013.01); *H04L 45/24* (2013.01)

(58) Field of Classification Search
CPC ........ H04L 47/122; H04L 45/22; H04L 45/24
USPC ............................................................ 370/237
See application file for complete search history.

(56) References Cited

U.S. PATENT DOCUMENTS

| | | | |
|---|---|---|---|
| 2,421,919 A | 6/1947 | Avery | |
| 3,155,775 A | 11/1964 | Zarouni | |
| 3,231,676 A | 12/1966 | Carlstrom et al. | |
| 3,342,945 A | 9/1967 | Hopper et al. | |
| 3,525,814 A | 8/1970 | Cox | |
| 3,591,724 A | 7/1971 | Yaku et al. | |
| 4,475,192 A | 10/1984 | Fernow et al. | |
| 4,484,326 A | 11/1984 | Turner | |
| 4,556,972 A | 12/1985 | Chan et al. | |
| 4,669,113 A | 5/1987 | Ash et al. | |
| 4,704,724 A | 11/1987 | Krishnan et al. | |
| 4,825,206 A | 4/1989 | Brice, Jr. et al. | |
| 4,862,496 A | 8/1989 | Kelly et al. | |
| 4,905,233 A | 2/1990 | Cain et al. | |
| 4,979,118 A | 12/1990 | Kheradpir | |

(Continued)

OTHER PUBLICATIONS

U.S. Appl. No. 14/335,234, filed Jul. 18, 2014, entitled "System and Method for Managing Bandwidth Usage Rates in a Packet-Switched Network".

(Continued)

*Primary Examiner* — Ajit Patel
*Assistant Examiner* — Pamit Kaur
(74) *Attorney, Agent, or Firm* — Neal Marcus

(57) ABSTRACT

A system and method is disclosed for optimizing traffic in a packet-switched network in the presence of Internet exchanges. In accordance with an embodiment of the present disclosure, a system is disclosed for optimizing Internet traffic on a computer network. The system includes one or more servers configured to execute computer programs steps. The computer program steps comprises configuring peers on an Internet exchange including identifying one or more peers on the Internet exchange that provide Internet service to a destination network, determining performance metrics of the one or more peers on an Internet exchange to determine at least one peer to which the Internet traffic may be re-routed, and determining if the Internet traffic for the destination network will be re-routed through the at least one peer based on the performance metrics.

19 Claims, 9 Drawing Sheets

(56) References Cited

U.S. PATENT DOCUMENTS

| | | |
|---|---|---|
| 4,991,204 A | 2/1991 | Yamamoto et al. |
| 5,042,027 A | 8/1991 | Takase et al. |
| 5,063,523 A | 11/1991 | Vrenjak |
| 5,088,032 A | 2/1992 | Bosack |
| 5,117,422 A | 5/1992 | Hauptschein et al. |
| 5,142,570 A | 8/1992 | Chaudhary et al. |
| 5,150,360 A | 9/1992 | Perlman |
| 5,179,027 A | 1/1993 | Fisher |
| 5,203,012 A | 4/1993 | Patsiokas et al. |
| 5,233,604 A | 8/1993 | Ahmadi et al. |
| 5,239,653 A | 8/1993 | Cubero-Castan et al. |
| 5,253,248 A | 10/1993 | Dravida et al. |
| 5,317,562 A | 5/1994 | Nardin et al. |
| 5,377,327 A | 12/1994 | Jain et al. |
| 5,467,345 A | 11/1995 | Cutler, Jr. et al. |
| 5,495,426 A | 2/1996 | Waclawsky et al. |
| 5,517,620 A | 5/1996 | Hasimoto et al. |
| 5,521,910 A | 5/1996 | Matthews |
| 5,557,747 A | 9/1996 | Rogers et al. |
| 5,615,254 A | 3/1997 | Qiu et al. |
| 5,668,951 A | 9/1997 | Jain et al. |
| 5,724,513 A | 3/1998 | Ben-Nun et al. |
| 5,742,587 A | 4/1998 | Zornig et al. |
| 5,781,534 A | 7/1998 | Perlman et al. |
| 5,781,634 A | 7/1998 | Cordery et al. |
| 5,838,663 A | 11/1998 | Elwalid et al. |
| 5,870,561 A | 2/1999 | Jarvis et al. |
| 5,870,581 A | 2/1999 | Redford |
| 5,881,051 A | 3/1999 | Arrowood et al. |
| 5,884,047 A | 3/1999 | Aikawa et al. |
| 5,898,668 A | 4/1999 | Shaffer |
| 5,933,425 A | 8/1999 | Iwata |
| 5,953,312 A | 9/1999 | Crawley et al. |
| 5,995,503 A | 11/1999 | Crawley et al. |
| 6,016,307 A | 1/2000 | Kaplan et al. |
| 6,044,075 A | 3/2000 | Le Boudec et al. |
| 6,047,326 A | 4/2000 | Kilkki |
| 6,047,331 A | 4/2000 | Medard et al. |
| 6,055,571 A | 4/2000 | Fulp et al. |
| 6,047,677 A | 5/2000 | Kappler et al. |
| 6,061,723 A | 5/2000 | Walker et al. |
| 6,084,858 A | 7/2000 | Matthews et al. |
| 6,097,699 A | 8/2000 | Chen et al. |
| 6,104,700 A | 8/2000 | Haddock et al. |
| 6,130,890 A | 10/2000 | Leinwand et al. |
| 6,154,778 A | 11/2000 | Koistinen et al. |
| 6,181,679 B1 | 1/2001 | Ashton et al. |
| 6,185,635 B1 | 2/2001 | O'Loughlin et al. |
| 6,226,751 B1 | 5/2001 | Arrow et al. |
| 6,236,642 B1 | 5/2001 | Shaffer et al. |
| 6,249,801 B1 | 6/2001 | Zisapel et al. |
| 6,252,848 B1 | 6/2001 | Skirmont |
| 6,256,314 B1 | 7/2001 | Rodrig et al. |
| 6,260,072 B1 | 7/2001 | Rodriguez-Moral |
| 6,262,976 B1 | 7/2001 | McNamara |
| 6,275,470 B1 | 8/2001 | Ricciulli |
| 6,292,464 B1 | 9/2001 | Elahmadi et al. |
| 6,301,244 B1 | 10/2001 | Huang et al. |
| 6,363,053 B1 | 3/2002 | Schuster et al. |
| 6,370,584 B1 | 4/2002 | Bestavros et al. |
| 6,374,300 B2 | 4/2002 | Masters |
| 6,393,486 B1 | 5/2002 | Pelavin et al. |
| 6,400,681 B1 | 6/2002 | Bertin et al. |
| 6,404,769 B1 | 6/2002 | Kapoor |
| 6,405,219 B2 | 6/2002 | Saether et al. |
| 6,456,594 B1 | 9/2002 | Kaplan et al. |
| 6,463,470 B1 | 10/2002 | Mohaban et al. |
| 6,466,984 B1 | 10/2002 | Naveh et al. |
| 6,473,802 B2 | 10/2002 | Masters |
| 6,493,317 B1 | 12/2002 | Ma |
| 6,516,192 B1 | 2/2003 | Spaur et al. |
| 6,522,881 B1 | 2/2003 | Feder et al. |
| 6,570,867 B1 | 5/2003 | Robinson et al. |
| 6,574,495 B1 | 6/2003 | Golman et al. |
| 6,578,076 B1 | 6/2003 | Putzolu |
| 6,594,268 B1 | 7/2003 | Aukia et al. |
| 6,606,303 B1 | 8/2003 | Hassel et al. |
| 6,658,457 B2 | 12/2003 | Nishikawa et al. |
| 6,665,702 B1 | 12/2003 | Zisapel et al. |
| 6,678,248 B1 | 1/2004 | Haddock et al. |
| 6,690,649 B1 | 2/2004 | Shimada |
| 6,697,333 B1 | 2/2004 | Bawa et al. |
| 6,718,359 B2 | 4/2004 | Zisapel et al. |
| 6,724,722 B1 | 4/2004 | Wang et al. |
| 6,728,265 B1 | 4/2004 | Yavatkar et al. |
| 6,745,243 B2 | 6/2004 | Squire et al. |
| 6,775,280 B1 | 8/2004 | Ma et al. |
| 6,785,237 B1 | 8/2004 | Sufleta |
| 6,801,502 B1 | 10/2004 | Rexford et al. |
| 6,816,464 B1 | 11/2004 | Scott et al. |
| 6,842,783 B1 | 1/2005 | Boivie et al. |
| 6,847,613 B2 | 1/2005 | Mimura et al. |
| 6,857,025 B1 | 2/2005 | Maruyama et al. |
| 6,914,886 B2 | 7/2005 | Peles et al. |
| 6,928,051 B2 | 8/2005 | Butt et al. |
| 6,947,379 B1 | 9/2005 | Gleichauf et al. |
| 6,954,431 B2 | 10/2005 | Roberts |
| 6,965,948 B1 | 11/2005 | Eneborg et al. |
| 6,981,055 B1 | 12/2005 | Ahuja et al. |
| 6,993,584 B2 | 1/2006 | Border et al. |
| 7,035,938 B2 | 4/2006 | Lau |
| 7,042,848 B2 | 5/2006 | Santiago et al. |
| 7,046,636 B1 | 5/2006 | Shaffer et al. |
| 7,051,367 B1 | 5/2006 | Krishnaswamy et al. |
| 7,065,044 B2 | 6/2006 | Wang et al. |
| 7,080,161 B2 | 7/2006 | Leddy et al. |
| 7,120,114 B1 | 10/2006 | Miyamoto |
| 7,133,365 B2 | 11/2006 | Klinker et al. |
| 7,139,242 B2 | 11/2006 | Bays |
| 7,222,190 B2 | 5/2007 | Klinker et al. |
| 7,230,919 B2 | 6/2007 | Flanagan et al. |
| 7,240,124 B2 | 7/2007 | Schwartz et al. |
| 7,245,609 B2 | 7/2007 | D'Eletto |
| 7,260,645 B2 | 8/2007 | Bays |
| 7,269,157 B2 | 9/2007 | Klinker et al. |
| 7,272,115 B2 | 9/2007 | Maher, III et al. |
| 7,286,479 B2 | 10/2007 | Bragg |
| 7,336,613 B2 | 2/2008 | Lloyd et al. |
| 7,343,413 B2 | 3/2008 | Glide et al. |
| 7,349,994 B2 | 3/2008 | Balonado et al. |
| 7,362,707 B2 | 4/2008 | McLampy et al. |
| 7,363,367 B2 | 4/2008 | Lloyd et al. |
| 7,363,371 B2 | 4/2008 | Kirkby et al. |
| 7,406,539 B2 | 7/2008 | Baldonado et al. |
| 7,457,233 B1 | 11/2008 | Gan et al. |
| 7,492,720 B2 | 2/2009 | Pruthi et al. |
| 7,561,517 B2 | 7/2009 | Klinker et al. |
| 7,606,160 B2 | 10/2009 | Klinker et al. |
| 7,668,966 B2 * | 2/2010 | Klinker ................ H04L 45/00 709/230 |
| 8,203,954 B1 | 6/2012 | Patel et al. |
| 8,223,951 B1 | 7/2012 | Edelhaus et al. |
| 8,266,327 B2 | 9/2012 | Kumar et al. |
| 8,429,630 B2 | 4/2013 | Nickolov et al. |
| 8,743,696 B2 | 6/2014 | Chowdhury |
| 8,891,513 B1 | 11/2014 | Huang et al. |
| 8,897,183 B2 | 11/2014 | Andreasen et al. |
| 8,977,284 B2 | 3/2015 | Reed |
| 9,049,197 B2 | 6/2015 | Lum et al. |
| 9,087,319 B2 | 7/2015 | Nguyen |
| 9,183,560 B2 | 11/2015 | Abelow |
| 9,253,663 B2 | 2/2016 | Raleigh et al. |
| 2001/0021176 A1 | 9/2001 | Mimura et al. |
| 2001/0023442 A1 | 9/2001 | Masters |
| 2001/0037387 A1 | 11/2001 | Gilde et al. |
| 2001/0042073 A1 | 11/2001 | Saether et al. |
| 2002/0010765 A1 | 1/2002 | Border |
| 2002/0010792 A1 | 1/2002 | Border et al. |
| 2002/0039352 A1 | 4/2002 | El-Fekih et al. |
| 2002/0057651 A1 | 5/2002 | Roberts |
| 2002/0057699 A1 | 5/2002 | Roberts |
| 2002/0075813 A1 | 6/2002 | Baldonado et al. |
| 2002/0078223 A1 | 6/2002 | Baldonado et al. |
| 2002/0040400 A1 | 8/2002 | Masters |

(56) References Cited

U.S. PATENT DOCUMENTS

| | | | |
|---|---|---|---|
| 2002/0103846 | A1 | 8/2002 | Zisapel et al. |
| 2002/0105909 | A1 | 8/2002 | Flanagan et al. |
| 2002/0105911 | A1 | 8/2002 | Pruthi et al. |
| 2002/0110084 | A1 | 8/2002 | Butt et al. |
| 2002/0129161 | A1 | 9/2002 | Lloyd et al. |
| 2002/0141378 | A1 | 10/2002 | Bays et al. |
| 2002/0145981 | A1* | 10/2002 | Klinker ............... H04L 41/0816 370/244 |
| 2002/0163884 | A1 | 11/2002 | Peles et al. |
| 2002/0176427 | A1* | 11/2002 | Noda ...................... H04L 29/06 370/401 |
| 2002/0184393 | A1 | 12/2002 | Leddy et al. |
| 2002/0186661 | A1 | 12/2002 | Santiago et al. |
| 2002/0199016 | A1 | 12/2002 | Freedman |
| 2003/0002443 | A1 | 1/2003 | Basso et al. |
| 2003/0012145 | A1 | 1/2003 | Bragg |
| 2003/0016627 | A1 | 1/2003 | McLampy et al. |
| 2003/0039212 | A1 | 2/2003 | Lloyd et al. |
| 2003/0076840 | A1 | 4/2003 | Rajagopal et al. |
| 2003/0086422 | A1 | 5/2003 | Klinker et al. |
| 2003/0088529 | A1 | 5/2003 | Klinker et al. |
| 2003/0088671 | A1* | 5/2003 | Klinker ................... H04L 29/06 709/225 |
| 2003/0118029 | A1 | 6/2003 | Maher, III et al. |
| 2003/0074449 | A1 | 8/2003 | Smith et al. |
| 2003/0079005 | A1 | 8/2003 | Myers et al. |
| 2003/0187934 | A1 | 10/2003 | Nishikawa et al. |
| 2004/0196787 | A1 | 10/2004 | Wang et al. |
| 2007/0041326 | A1 | 2/2007 | Babiarz et al. |
| 2013/0282897 | A1* | 10/2013 | Siegel ................. H04L 43/0876 709/224 |
| 2013/0322255 | A1 | 12/2013 | Dillon |
| 2014/0101228 | A1 | 4/2014 | Dalela |
| 2015/0029864 | A1 | 1/2015 | Raileanu et al. |
| 2016/0080502 | A1 | 3/2016 | Yadav et al. |

OTHER PUBLICATIONS

Y. Rekhter, T. Li, S. Hares, "A Border Gateway Protocol 4 (BGP-4)", The Internet Engineering Task Force (IETF), RFC 4271, Jan. 2006. (http://www.ietf.org/rfc/rfc4271.txt).
B. Claise, Ed., "Specification of the IP Flow Information Export (IPFIX) Protocol for the Exchange of IP Traffic Flow Information," The Internet Engineering Task Force (IETF), RFC 5101, Jan. 2008. (http://www.ietf.org/rfc/rfc5101.txt).
B. Claise, Ed., "Cisco Systems NetFlow Services Export Version 9", The Internet Engineering Task Force (IETF), RFC 3954, Oct. 2004. (http://www.ietf.org/rfc/rfc3954.txt).
V. Fuller, T. Li, "Classless Inter-domain Routing (CIDR): The Internet Address Assignment and Aggregation Plan", The Internet Engineering Task Force (IETF), RFC 4632, Aug. 2006. (http://www.ietf.org/rfc/rfc4632.txt).
J. Moy, "OSPF Version 2", The Internet Engineering Task Force (IETF), RFC 2328, Apr. 1998. (http://www.ietf.org/rfc/rfc2328.txt).
D. Savage, D. Slice, J. Ng, S. Moore, R. White, "Enhanced Interior Gateway Routing Protocol, draft-savage-eigrp-00.txt", The Internet Engineering Task Force (IETF), Feb. 18, 2013. (https://tools.ietf.org/html/draft-savage-eigrp-00).
P. Phaal, S. Panchen, N. McKee, "InMon Corporation's sFlow: A Method for Monitoring Traffic in Switched and Routed Networks", The Internet Engineering Task Force (IETF), RFC 3176, Sep. 2001. (https://www.ietf.org/rfc/rfc3176.txt).
P. Phaal, "sFlow Version 5", Jul. 2004. (http://www.sflow.org/sflow_version_5.txt).
U.S. Appl. No. 14/607,545, filed Jan. 28, 2015, entitled "A System and Method of Providing a Platform for Optimizing Traffic Through a Computer Network With Distributed Routing Domains Interconnected Through Data Center Interconnect Links" (Maxim Basunov).
U.S. Appl. No. 14/335,234, filed Jul. 18, 2014, "System and Method for Managing Bandwidth Usage Rates in a Packet-Switched Network" (Grigore Raileanu et al.).
Jeff Caruso. "Net Management Wises Up". Network World, Dec. 14, 1998. p. 8.
Bob Wallace. "Cisco and Concord Promise Carrier Info". Computerworld, Dec. 21, 1998. p. 16.
Steven Low. "Optimization Flow Control With On-Line Measurement or Multiple Paths". University of Melbourne, Feb. 25, 1999.
"HP OpenView NetMatrix/UX Distributed Network Analysis Version 6.02". DNA User's Guide, Jun. 1999.
"Cisco IOS 12.0 Quality of Service". "Policy-Based Routing". Cisco Press, Apr. 23, 1999. p. 6-7.
D. Awduche, J. Malcolm, J. Agogbua, M. O'Dell, J. McManus. "Requirements for Traffic Engineering Over MPLS". Request for Comments 2702, Network Working Group, Sep. 1999.
G. Apostolopoulos, D. Williams, S. Kamat, R. Guerin, A. Orda, T. Przygienda. "QoS Routing Mechanisms and OSPF Extensions". Request for Comments 2676, Network Working Group, Aug. 1999.
Wei Sun. "QoS/Policy/Constraint Based Routing". Ohio State University, Dec. 1, 1999.
"Transport Network Event Correlation". International Telecommnuication Union, Feb. 2000.
"Tivoli NetView Performance Monitor for TCP/IP Helps Optimize IP Network Performance". IBM, Sep. 5, 2000.
Peter Morrissey. "IP Routing Primer: Part Five". Network Computing, Dec. 4, 2000.
P. Phaal, S. Panchen, N. McKee. "Request for Comments 3176; InMon Corporation's sFlow: A Method for Monitoring Traffic in Switched and Routed Networks". Network Working Group, Sep. 2001.
David Anderson, Hari Balakrishnan, Frans Kaashoek, Robert Morris. "Resilient Overlay Networks". AC, Oct. 2001.
"Tivoli NetView 7.1 Offers Enhanced Network Management Capabilities at Lower Cost". IBM, Oct. 16, 2001.
"Capital Rut Has Little Weight for Internet Route Controllers". The Wall Street Journal (www.wsj.com/artciles/SB101097122166056660), Jan. 14, 2002.
Hedrick, Charles L. "An Introduction to IGRP". Document ID 26825, Rutgers University, The State University of New Jersey, Center for Computers and Information Services, Laboratory for Computer Science Research, Aug. 22, 1991.
Jacobson, Van, and Karels, Michael J. "Congestion Avoidance and Control." Nov. 1988.
"Proficient Networks NPE1010A Network Policy Engine". Proficient Networks, Inc. Copyright 2001.
Cisco. "Cisco-IGRP Metric". Cisco Systems, Inc., 1992-2002.
Aukia, Petri, and Oy, Nixu. "Quality of Service Based Routing". (http://web.archive.org/web/20051124171849/http://www.tml.tkk.fi/Opinnot/Tik-110.551/1996/qos_rout.html). Nov. 24, 2005.
Cisco. "BGP Link Bandwidth". pp. 1-16, Cisco Systems, Inc., Jan. 6, 2011.
Baumann, Rainer, Heimlicher, Simon, Strasser, Mario, and Weibel, Andreas. "A Survey on Routing Metrics". TIK Report 262, Computer Engineering and Networks Laboratory, ETH-Zentrum, Switzerland, Feb. 10, 2007.
Rekhter, Y., and Li, T. A Border Gateway Protocol 4 (BGP-4). Request for Comments: 1771, T.J. Watson Research Center, IBM Corp., Mar. 1995.
"HP fortifies management tools". WANs & Internetworking, Network World, Dec. 2, 1996, p. 17.
Seshan, Srinivasan, et al. "Handoffs in Cellular Wireless Networks: The Daedalus Implementation and Experience". Wireless Personal Communications, Jan. 1997.
"Route Control: Building Real Confidence in the Internet". TeleChoice, Feb. 28, 2002.
Leinwand, Allan. "Network Policy Engine NPE1010A Appliance". Network World, The Signature Series, Apr. 29, 2002.
Fitzsimmons, Heather. "Proficient Networks Unveils Comprehensive Bandwidth Management Capabilities for the Enterprise Data Center." Business Wire, Jun. 23, 2003.
Cisco. "Response Time Reporter Enhancements". CISCO IOS Release 12.0(3)T. Mar. 18, 2006. (http://web.archive.org/web/*/http://www.optimumdata.com/shop/files/cisco/2600/2600_Response_Time_Reporter_Enhancements.pdf).

(56) References Cited

OTHER PUBLICATIONS

Gomez, Shaun. "CCIE Studies: Performance Routing PfR/OER". Technology Evangelist, Jul. 22, 2013.
Sharma, Ranjana. "Telemanagement Packages Centralize Net Control". Network World, May 16, 1988, p. 73.
Scott, Karyl. "NetWare Routing Router-Basic". Infoworld, Jul. 13, 1992, p. 47.
Duffy, Jim. "Frontier Software Pioneers RMON for the WAN with NETscout Analyzer". Network World, Aug. 16, 1993, p. 17.
"Netview Performance Monitor Version 2 Release 1". Announcement letter No. 293-625, IBM. dated Oct. 28, 1993.
Dryden, Patrick. "The LAN, WAN Monitoring Frontier". Computerworld, Jul. 15, 1996, p. 63.
Fitzloff, Emily. "HP NetMetrix 5.0 Gets Improved RMON2 Capabilities". Infoworld, Sep. 22, 1997, p. 51.
Duffy, Jim. "HP Plans Big Event for OpenView 6.0". Network World, Dec. 15, 1997, p. 5.
Wallace, Bob. "Cisco and Concord Promise Carrier Info". Computerworld, Dec. 21, 1998, p. 16.
Opnix. Copyright 2000. (www.opinix.com/whatwedo/whatwedo.shtml).
Howe, Peter J. "Sockeye Wins $28 Million in VC Funds for its Routing System Gets Data Past Net Traffic Jams". p. C3, Business Section, The Boston Globe, Jun. 25, 2001.
"Company Overview". Sockeye Networks. (http://web.archive.org/web/20010702084014/http://www.sockeye.com/pages/overview.htm), Jul. 2, 2001.
Fitzloff, Emily. "Seagate NerveCenter to Provide Mixed NT/Unix Event Correlation". Infoworld, Feb. 9, 1998, p. 45.
Duffy, Jim. "HP to Pop Two Products for Network Service Management". Network World, Jun. 1, 1998, p. 13.
Francis, Peter. "Re: Routescience?" North American Network Operators Group, Aug. 22, 2001.
Routescience. "Introducing Routescience Pathcontrol". RouteScience Technologies, Inc., Copyright 2001.
Non-Final Office Action dated Apr. 18, 2017 for U.S. Appl. No. 14/335,234, filed Jul. 18, 2014 (Raileanu et al.).
Non-Final Office Action dated Apr. 22, 2016 for U.S. Appl. No. 14/335,234, filed Jul. 18, 2014 (Raileanu et al.).
Non-Final Office Action dated Sep. 8, 2016 for U.S. Appl. No. 14/335,234, filed Jul. 18, 2014 (Raileanu et al.).
Zhang, Lixia. "VirtualClock: A New Traffic Control Algorithm for Packet Switching Networks." ACM 1990.
"What We Do—Simply High-Performance Bandwidth." Jan. 24, 2001. Opnix. (http://web.archive.org/web/20010124043200/http://www.opnix.com/whatwedo/performance.shtml).
Savage, Stefan et al. "End-to-End Effects of Internet Path Selection." Department of Compute Science and Engineering, University of Washington, 1990.
"What is Best Path Global Transit." Opnix. Copyright 2000.
"Routing Intelligence System, Taming Internet Performance." Orbit 1000 routing intelligence system, Opnix, Inc. Copyright 2001.
John J. Hunter. "Topological optimization, Two new software tools help network planners optimize designs." p. 47, Network World. Sep. 14, 1987.
"Network Monitoring Using Cisco Service Assurance Agent." Feb. 24, 2014. (Archive.org—http://www.cisco.com/c/en/us/td/docs/ios/12_2/configfu/index.html).
G. Apostolopoulos, R. Gu'erin, S. Kamat, and S. Tripathi. "Improving QoS routing performance under inaccurate link state information," in Proceedings of ITC'16, Jun. 1999.
Jim Duffy. "HP fortifies management tools." p. 17, Network World. Dec. 2, 1996.
"Carbon Copy Release 3.0" and "Multi-Log X.25." p. 26, Network World. Sep. 8, 1986.
Ranjana Sharma. "Telemanagement packages centralize net control." p. 73, Network World. May 16, 1988.
"Network Performance Monitor Version 2 Release 1." IBM. Oct. 28, 1993.
Bob Wallace. "Cisco and Concord promise carrier info." Computerworld. Dec. 1, 1998.
Opnix. Jan. 24, 2001. (Archive.org).
"Introducing Routescience Pathcontrol." RouteScience Technologies, Inc. Copyright 2001.
Skip Macaskill. Chipcom casts its dice in switch mgmt. game. Network World. Jun. 15, 1994.
Patrick Dryden. "The LAN, WAN monitoring frontier." p. 63, Computerworld. Jul. 15, 1996.
"Load Balancing with CEF." Cisco Systems. Dec. 14, 2002. (http://www.cisco.com/en/US/products/hw/modules/ps2033/prod_technical_reference09186a00800afeb7.html).
Non-Final Office Action dated Jul. 19, 2016 for U.S. Appl. No. 14/607,545, filed Jan. 28, 2015 (Basunov).
Notice of Allowance dated Apr. 20, 2017 for U.S. Appl. No. 14/607,545, filed Jan. 28, 2015 (Basunov).
Leonard Kleinrock, "Message Delay in Communication Nets with Storage". Massachusetts Institute of Technology, Dec. 1962.
John M. McQuillan, Ira Richer, Eric C. Rosen. "The New Routing Algorithm for the ARPANET". IEEE Transactions on Communications, May 1980. p. 711-19.
D.L. Mills. "Request for Comments 904; Exterior Gateway Protocol Formal Specification". Network Working Group, Apr. 1984.
"Products and Services". Network World, Sep. 8, 1986, p. 26-27.
Paul Korzeniowski. "Early users give thumbs up to Peregrine system". Network World, Sep. 28, 1987. p. 23-25.
Ranjana Sharma. "Telemanagement packages centralize net control". Network World, May 16, 1988. p. 73.
J. Case, M. Fedor, M. Schoffstall, J. Davin. "Requests for Comments 1067; A Simple Network Management Protocol". Network Working Group, Aug. 1988.
"Principles for a Telecommunications Management Network" International Telecommunication Union, Nov. 1988.
J. Rekhter. "Request for Comments 1092; EGP and Policy Based Routing in the New NSFNET Backbone", Feb. 1989.
K. Lougheed, Y. Rekhter. "A Border Gateway Protocol". Request for Comments 1105, Network Working Group, Jun. 1989.
M. Little. "Goals and Functional Requirements for Inter-Autonomous System Routing". Request for Comments 1126, Network Working Group. Oct. 1989.
J. Moy. "The OSPF Specification". Request for Comments 1131, Network Working Group, Oct. 1989.
Dr. Jason Liu. "Advanced Facilities to Expedite Design and Evaluation of Communications Systems". SBIRSource, Dec. 31, 1989.
David Oran. "OSI IS-IS Intra-domain Routing Protocol". Request for Comments 1142, Network Working Group, Feb. 1990.
Paul Li. "Who's accepting deposits in the repository?" Network World, Apr. 16, 1990. p. 37.
K. McCloghrie, M. Rose. "Request for Comments 1213; Management Information Base for Network Management of TCP/IP-Based Internets: MIB-II". Network Working Group, Mar. 1990.
Charles L. Hedrick Rutgers. "An Introduction to IGRP". Cisco, Aug. 22, 1991.
Roch A. Guerin, Hamid Ahmadi, Mahmoud Naghsineh. "Equivalent Capacity and Its Application to Bandwidth Allocation in High-Speed Networks". University of Pennsylvania Scholarly Commons, Sep. 1, 1991. p. 968-81.
K. Lougheed, Y. Rekhter. "A Border Gateway Protocol 3 (BGP-3)", Request for Comments 1267, Network Working Group. Oct. 1991.
Y. Rekhter, P. Gross. "Application of the Border Gateway Protocol in the Internet", Request for Comments 1268, Network Working Group, Oct. 1991.
P. Almquist. "Type of Service in the Internet Protocol Suite". Request for Comments 1349, Network Working Group, Jul. 1992.
Karyl Scott. "NetWare Multiprotocol Router-Basic". InfoWorld, Jul. 13, 1992. p. 47.
Cengiz Alaettinoglu, A. Udaya Shankar, Klaudia Dussa-Zieger, Ibrahim Mafia. "Design and Implementation of MaRS: A Routing Testbed". University of Maryland, Sep. 1992.
Jim Duffy. "Frontier Software Pioneers RMON for the WAN with NETscout Analyzer". Network World, Aug. 16, 1993. p. 17.
"Announcement Letter No. 293-625". IBM, Oct. 28, 1993. p. 1-12.

(56) References Cited

OTHER PUBLICATIONS

R. Fabregat-Gasa, J.L. Marzo-Lazaro, J. Sole-Pareta, J. Domino-Pascual. "Adaptive Routing Based on Real-Time Calculations Using the Convolution Approach". EFOC & N, 1994.
Frisch et al., Network Management and Control, vol. 2, Plenum Press, 1994. p. 471.
J. Moy. "OSPF Version 2". Request for Comments 1583, Network Working Group, Mar. 1994.
Abhay K. Parekh, Robert G. Gallagher. "A Generalized Processor Sharing Approach to Flow Control in Integrated Services Networks: The Multiple Node Case". IEEE/ACM Transactions on Networking, Apr. 1994.
Skip MacAskill. "Chipcom casts its dice in switch mgmt. game". Network World, Jun. 15, 1994. p. 87.
Y. Rekhter. "A Border Gateway Protocol 4 (BGP-4)". Request for Comments 1654, Network Working Group, Jul. 1994.
S. Waldbusser. "Remote Network Monitoring Management Information Base". Request for Comments 1757, Network Working Group, Feb. 1995.
Y. Rekhter, P. Gross. "Application of the Border Gateway Protocol in the Internet". Request for Comments 1772, Network Working Group, Mar. 1995.
"BISDN Inter Carrier Interface (B-ICI) Specification Version 2.0 (Integrated)". The ATM Forum Technical Committee, Dec. 1995.
"Private Network—Network Interface Specification Version 1.0 (PNNI 1.0)". The ATM Forum Technical Committee, Mar. 1996.
J. Hawkinson, T. Bates. "Guidelines for Creation, Selection and Registration of an Autonomous System (AS)". Request for Comments 1930, Network Working Group, Mar. 1996.
Patrick Dryden. "The LAN, WAN Monitoring Frontier". Computerworld, Jul. 15, 1996.
John McConnell. "Behavior mgmt tames client/server environments". Network World, Apr. 22, 1996. p. 44.
E. Chen, T. Bates. "An Application of the BGP Community Attribute in Multi-Home Routing". Request for Comments 1998, Network Working Group, Aug. 1996.
Zheng Wang, Jon Crowcroft. "Quality-of-Service Routing for Supporting Multimedia Applications". IEEE Journal on Selected Areas in Communications, Sep. 1996. p. 1228-34.
R. Minnear, R. Hinden. "IGRPng for IPv6", Internet Draft, IGRPng, Nov. 1996.
"Frontier Software Development Becomes NetScout Systems, taking on name of leading product family". Business Wire, Mar. 31, 1997.
S. Shenker, J. Wroclawski. "General Characterization Parameters for Integrated Service Network Elements". Request for Comments 2215, Network Working Group, Sep. 1997.
Emily Fitzloff. "HP NetMetrix 5.0 gets improved RMON2 capabilities". p. 51, Infoworld, Sep. 2, 1997.
Kevin Thompson, Gregory J. Miller, Rick Wilder. "Wide-Area Traffic Patterns and Characteristics" (Extended Version). IEEE Network, Nov./Dec. 1997.
Jim Duffy. "HP Plans Big Event for Open View 6.0". p. 5. Network World, Dec. 15, 1997.
"Tivoli NetView Performance Monitor Expands Monitoring Support to TCP/IP". IBM, Jun. 23, 1998.
E. Crawley, R. Nair, B. Rajagoapala. "A Framework for QoS-Based Routing in the Internet". Request for Comments 2386, Network Working Group, Aug. 1998.
Andy Collins. "The Detour Framework for Packet Rerouting", University of Washington, Oct. 29, 1998.

\* cited by examiner

SYSTEM AND METHOD FOR OPTIMIZING TRAFFIC IN PACKET-SWITCHED NETWORKS WITH INTERNET EXCHANGES

FIELD OF THE INVENTION

The present invention relates to a system and method for optimizing traffic in packet-switched networks with Internet exchanges.

BACKGROUND OF THE INVENTION

Multi-homed networks are connected to the Internet through several Internet service providers (ISPs). Multi-homed networks are advantageous if one of the connections to an ISP fails. As soon as a router interconnected to that ISP determines that the connection is lost, it re-routes all data through other ISPs. However, in order to decrease operational costs and improve network utilization, reliability and performance, multi-homed networks require bandwidth, performance and cost management and control. Bandwidth, performance and cost management and control typically involves measuring, evaluating and re-routing some traffic from existing routes to alternative available routes with improved characteristics.

In such multi-homed networks, routing must be managed for each provider interface. A provider interface is a hardware part of a router or network device designated for connection with an ISP's router or other hardware as known to those skilled in the art. The typical solution for managing routes is to manually set route priority and blocking policies which reroute some network prefixes to other provider interfaces. However, this task is too complex and time consuming when it must be performed on an ongoing or periodic basis.

Usually provider interfaces interconnect with one another in a point to point configuration as known to those skilled in the art. In such a configuration, the sender is confident that routed packets dispatched to a provider interface will be delivered to the intended receiving ISP by the data link layer of the ISO OSI network stack. This is not true for point to multipoint configurations. That is, in a point to multipoint configuration a packet dispatched to a provider interface can reach any of the many peers. Internet exchanges (IX or IXP) represent an example of a point to multipoint configuration. In a point to multipoint configuration, it is mandatory that the packet, besides being dispatched to a provider interface for processing, also includes the necessary markers that tell the data link network to which of the peers' provider interfaces to deliver it.

Partial providers (ISPs that service packets addressed to only a few destination networks as described below) and Internet exchanges as known to those skilled in the art are active (live) environments with peers either joining, reconfiguring their serviced Internet segments or leaving the Internet exchange. While it is feasible to manually control the network configuration of small Internet exchanges or single partial providers, control becomes unfeasible in the case of large Internet exchanges that interconnect many tens or even hundreds of peers or in the case of big controlled networks that have multiple partial provider agreements. At scale, the large number of configuration changes is intractable for human operators.

At the same time, human operators can employ experience, logic and intelligence to make non-obvious re-routing decisions and enforce them in their network configuration or policies. In case of a bad decision, the operator may revert to the previous decision. However, this becomes hard when re-routing in the presence of large Internet exchanges. That is, re-routing decisions may cause packets addressed to a destination network to be re-routed to Internet exchange peers that do not actually service such destination network. In this situation, packets will be dropped.

It would thus be advantageous to provide a system and method that will overcome the problems with the systems described above.

SUMMARY OF THE INVENTION

A system and method is disclosed for optimizing traffic in a packet-switched network with Internet exchanges.

In accordance with an embodiment of the present disclosure, a system is disclosed for optimizing Internet traffic on a computer network. The system includes one or more servers configured to execute computer programs steps. The computer program steps comprises: configuring peers on an Internet exchange including identifying one or more peers on the Internet exchange that provide Internet service to a destination network; determining performance metrics of the one or more peers on an Internet exchange to determine at least one peer to which the Internet traffic may be re-routed; and determining if the Internet traffic for the destination network will be re-routed through at least one peer based on the performance metrics.

In accordance with yet another embodiment of the disclosure, a system is disclosed for optimizing one or more servers configured to execute computer programs steps. The computer program steps comprises: (a) retrieving from a network router that communicates with one or more Internet service providers in the network configuration information that relates to the one or more peers on the Internet exchange; (b) assigning IP markers to the one or more peers on the Internet exchange; (c) identifying network prefixes for probing; (d) determining if the one or more peers on the Internet exchange provide Internet service to any of the probed network prefixes; (e) probing the network prefixes through one or more Internet transit providers to determine performance characteristics through the one or more transit providers; and (f) probing the network prefixes via one or more peers on the Internet exchange determined to provide Internet service to the destination network to determine performance characteristics through the one or more peers.

In accordance with yet another embodiment of the disclosure, a method is disclosed of optimizing Internet traffic on a computer network. The method implemented in one or more servers. The method comprising: configuring one or more peers on an Internet exchange; periodically updating data relating to any of the one or more peers that provide Internet service to network prefixes; measuring performance characteristics of the one or more peers on the Internet exchange; monitoring Internet traffic at a first provider interface and determining if some or all of the Internet having better performance or cost characteristics if re-routed through a second provider interface; determining if the re-routed traffic will be routed through the one or more peers on the Internet exchange; and re-routing the Internet traffic from the first provider interface having performance or cost characteristics to the second provider interface having better performance or cost characteristics than the first provider interface.

DETAILED DESCRIPTION OF THE INVENTION

In the following detailed description, reference will be made to the accompanying drawing(s), in which identical functional elements are designated with numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. In addition, certain terms used herein are defined in this disclosure.

Figure 1:
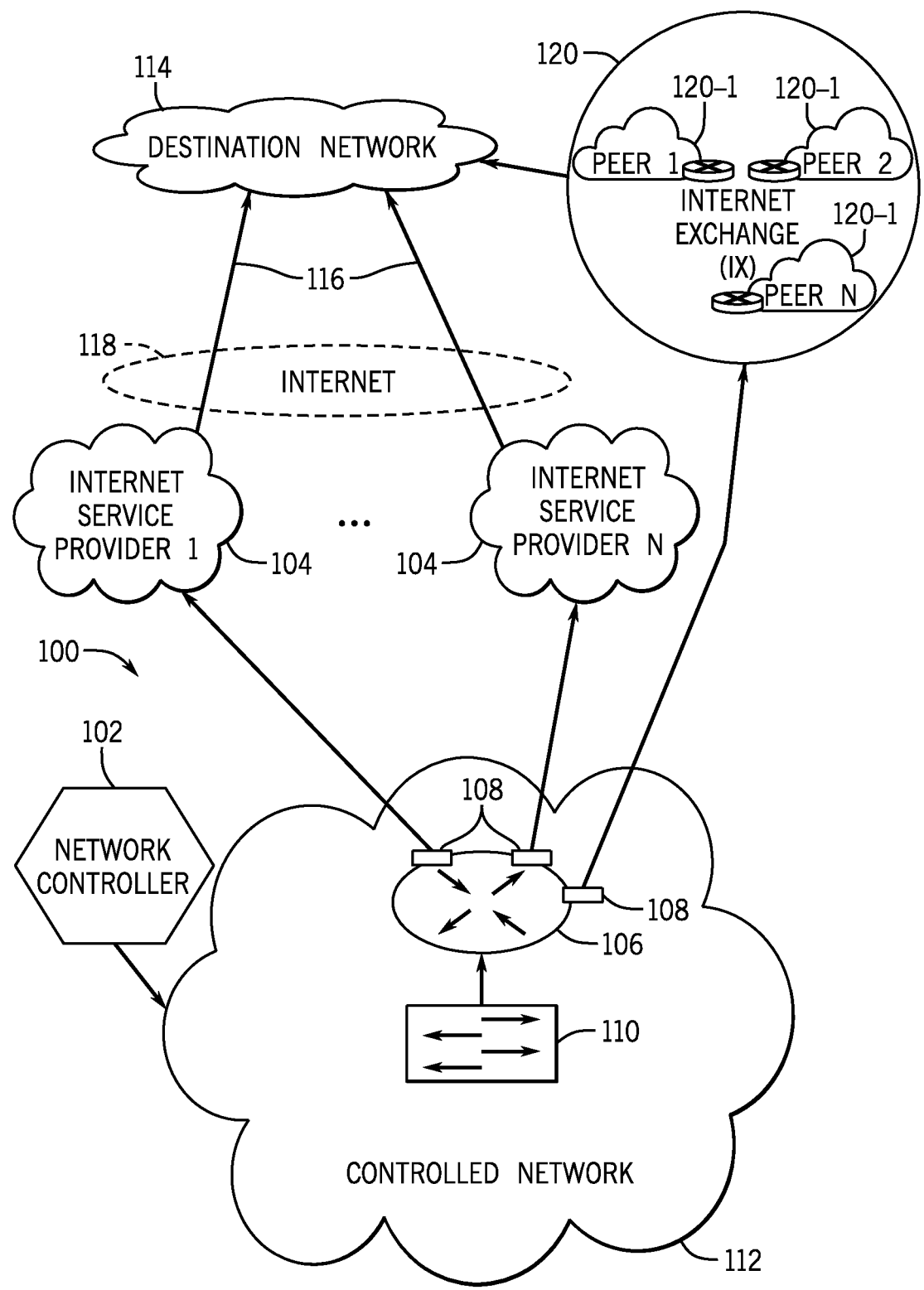
FIG. 1 illustrates a diagram of an example system for optimizing traffic in packet-switched networks wherein an Internet exchange is present.

FIG. 1 illustrates a diagram of an example system 100 for optimizing traffic in a packet-switched network wherein an Internet exchange is present. In particular, system 100 includes network controller 102, two or more Internet service providers 104, one or more routers 106, provider interfaces 108, network device 110, controlled network 112 and destination network 114.

Controlled network 112 is connected to Internet service providers 104 via routers 106. Network controller 102 is connected to (communicates with) controlled network 112 and network device 110. Network device 110 is connected to routers 106. Routers 106 are also connected to Internet service providers 104 via provider interfaces 108. Internet service providers 104 are connected to (communicate with) destination network 114 via communication paths 116 (through Internet 118) as known to those skilled in the art.

Network controller 102 includes one or more servers or other computers that comprise a set of software modules for implementing system 100 in accordance with embodiments of this disclosure. Network controller 102 and these modules are discussed in more detail below.

Destination network 114 is the remote network in which Internet traffic (packets) is intended for delivery.

Internet service providers 104 are networks that service packets from customers, neighbors or peers as known to those skilled in the art.

Routers 106 are components in the controlled network 112 that are used to route data through a network as known to those skilled in the art. Routers 106 provide dynamic routing protocol support and IP traffic statistics reporting (export). Edge routers are routers 106 that interconnect controlled network 112 with Internet service providers 104 as known to those skilled in the art.

Controlled network 112 comprises (1) computer servers, routers and other components including routers 106 and network device 110 and (2) computer program modules and other software that make a network of a business or enterprise.

Provider interfaces 108 are a hardware part of routers 106 or alternatively part of network device 110. Provider interfaces 108 are used to provide data links to the routers and/or other hardware components of Internet service providers 103.

Network device 110 is a component within controlled network 112. Network device 110 includes one or more packet switches, routers or other network devices as known to those skilled in the art with the ability to duplicate traffic data. Network device 110 is used to copy all transit IP packets to traffic controller 102-3 as described below. (Routers 106 can function similarly to network device 110 and network device 110 can function similarly to routers 106).

As indicated above, there are alternative communication routes 102 (depicted but not limited to two) connecting controlled network 112 to destination network 114 via Internet service providers 104. In order for system 100 to operate as disclosed herein, controlled network 112 must incorporate two or more alternative communication routes 116 to the destination network 114 to enable the proper re-routing of traffic (data). In accordance with an embodiment of the present disclosure, system 100 will work as described when at least an Internet service provider of type Internet exchange 120 or partial provider is configured by human operator.

Internet exchange 120, as known to those skilled in the art, enables networks to interconnect directly via the Internet exchange medium. The Internet exchange typically includes one more network switches to which each of the participating Internet service providers connect.

Figure 2:
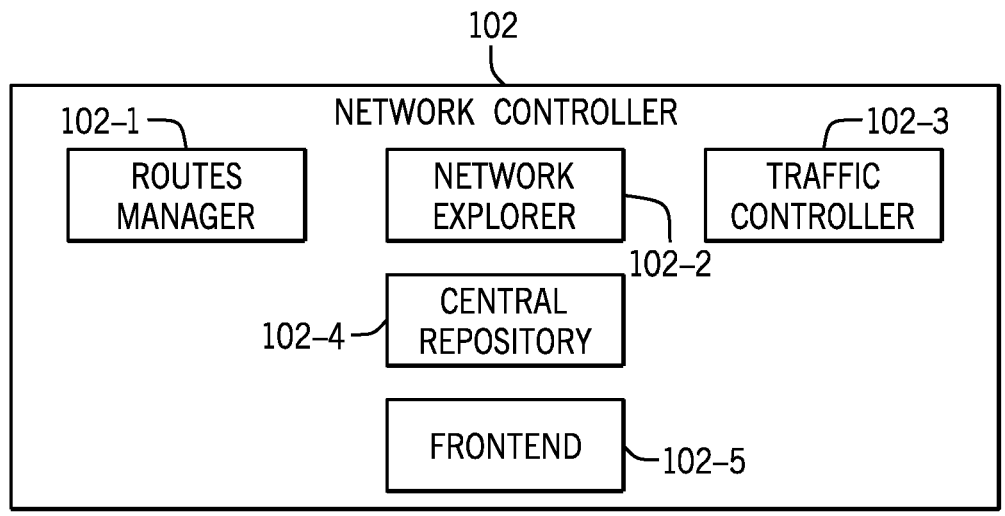
FIG. 2 illustrates the network controller of FIG. 1 wherein internal modules are shown.

Reference is now made to FIG. 2 wherein the internal modules of network controller 102 in FIG. 1 are shown in detail. As indicated above, network controller 102 is a system that includes one or more servers incorporating a plurality of computer program modules. These servers include, among other components, one or more processors for executing the plurality of computer program modules. These modules include routes manager 102-1, network explorer 102-2, traffic controller 102-3, central repository 102-4, and frontend 103-5. The modules described above or portions thereof may be incorporated on servers and/or other components that are part of or entirely separate from controlled network 112 as known to those skilled in the art. Network controller 102 is connected to controlled network 112.

Routes manager 102-1 is a module used for communicating with routers 106 for injecting routing changes via any method for automatic route management as known to those skilled in the art. An example of such protocols is Border Gateway Protocol (BGP-4) as defined in the Y. Rekhter, T. Li, S. Hares, "A Border Gateway Protocol 4 (BGP-4)", IETF RFC 4271.

Network explorer 102-2 is a module used for determining network prefix reachability and measuring and collecting each network prefix performance metrics that can be used to make routing table change decisions (e.g., packet loss, latency, jitter as well as other metrics known to those skilled in the art) and stores these metrics into the central repository 102-4. This is referred to as probing to distinguish from processes that determine reachability, measure and collect data for other purposes.

Traffic controller 102-3 is a module that evaluates network prefixes carrying a specific amount of bandwidth by using different network monitoring protocols for gathering IP traffic statistics, analyzes data collected by network explorer 102-2 and makes traffic re-routing decisions.

Central repository 102-4 is a module for storing module(s) configuration information and transferring or storing data exchanged between the modules. Central repository 102-4 may be a database or other storage solution.

Frontend 103-5 is a module for interacting with operators to enable them to configure, review, monitor and report to an operator. That is, front end 103-5 is a visual interaction interface between operator and network controller 102. Frontend 103-5 is described in more detail below. (The operator may be a person or automatic management, monitoring or reporting system as known to those skilled in the art.)

As indicated above, traffic controller 102-3 periodically retrieves provider interfaces 108 traffic statistics from routers 106 and network device 110, decides what network prefixes are relevant for further processing and stores this data in central repository 102-4. The network explorer 102-2 probes each network prefix performance metrics, such as packet loss, latency, jitter, and stores these metrics into the central repository 102-4. Traffic controller 102-3 retrieves from central repository 102-4 the list of network prefixes with probing results completed by network explorer 102-2 and evaluates if re-routing is possible in accordance with an embodiment of the present disclosure. Routes manager 102-1 applies the decision made by traffic controller 102-3 to a single or multiple routers 106.

Traffic controller 102-3 collects IP traffic statistics, based upon network monitoring protocols known to those skilled in the art. An example of such protocols is IP Flow Information Export (IPFIX). IPFIX is described in "Specification of the IP Flow Information Export (IPFIX) Protocol for the Exchange of IP Traffic Flow Information," B. Claise, IETF RFC 5101, January 2008. Another exemplary protocol is derived from sFlow in accordance with the protocol specifications promulgated by the sFlow.org consortium, NetFlow, or analyzing raw, duplicated traffic data. These standards/specifications and protocols may be found at the Internet Engineering Taskforce (IETF) Website at www.ietf.org.

The statistics (i.e., the total amount of bytes sent in IP packets to particular destination addresses) collected are aggregated into network prefixes carrying a specific amount of bandwidth based on the list of network prefixes retrieved from the central repository 102-4 per each provider interface 108 separately.

As indicated above, frontend 103-5 is an interaction interface between operator and network controller 102. Frontend 103-5 is used for configuration, reporting and management purposes. Frontend 103-5 includes a GUI (Graphical User Interface), CLI (Command Line Interface), Statistical Reports an API (Application Programming Interface) and/or other interfaces known to those skilled in the art. As indicated above, operator can be human beings, automated systems, monitoring systems or other systems known to those skilled in the art. Operator can manage or configure the network controller 102 using the frontend 103-5, which enables adding, editing, deleting data (or other actions) used and exchanged between the modules and the configuration parameter values. This resulting configuration information is then stored in the central repository 102-4 of network controller 102 in accordance with an embodiment of the present disclosure.

A network prefix is a part of the IP address space in accordance with either IP version 4 or IP version 6 as known to those skilled in the art. Specifically, a network prefix is a network part of an IP address and network size. Data packets contain a destination addresses. These destination addresses are aggregated (transformed) into network prefixes. Addresses can be aggregated into a fixed size (IPv4 or IPv6) subnet. Subnetting is performed for destination IP addresses to compose the network prefix. The corresponding description for subnets and prefixes is defined in V. Fuller, T. Li, "Classless Inter-domain Routing (CIDR)", IETF RFC 4632.

Network controller 102 in accordance with an embodiment of the present disclosure is useful when at least one Internet service provider in the plurality of Internet service providers that the controlled network 112 connects with is of type Internet exchange or partial provider.

Figure 3:
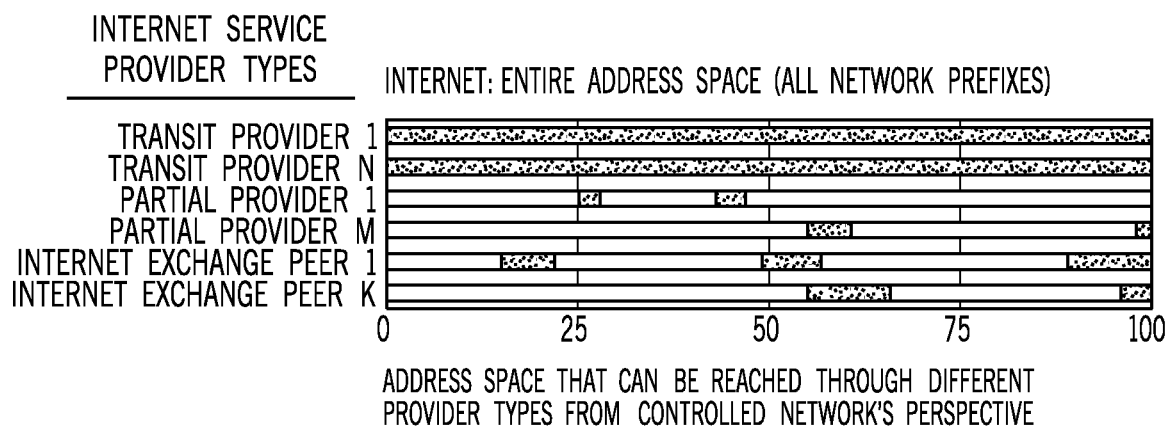
FIG. 3 illustrates an example Internet service coverage graph wherein different type of agreements with Internet service providers are shown.

FIG. 3 illustrates an example Internet service coverage graph wherein different type of agreements with Internet service providers are shown. Specifically, an example configuration is shown of different Internet service provider agreements that is automatically evaluated by network controller 102 in accordance with an embodiment of the present disclosure. The horizontal bars in FIG. 3 represent network prefixes/segments that are serviced by different types of Internet service providers 104. The method (algorithm) of network controller 102 in accordance with an embodiment of this disclosure automatically identifies the network prefixes serviced by Internet service provider of type partial provider or Internet exchange peer (routing tables are used to establish network prefixes/segments that are serviced) and is able to re-route via these Internet service provider types only such traffic that will be serviced by them and also improves performance or cost characteristics.

Figure 4:
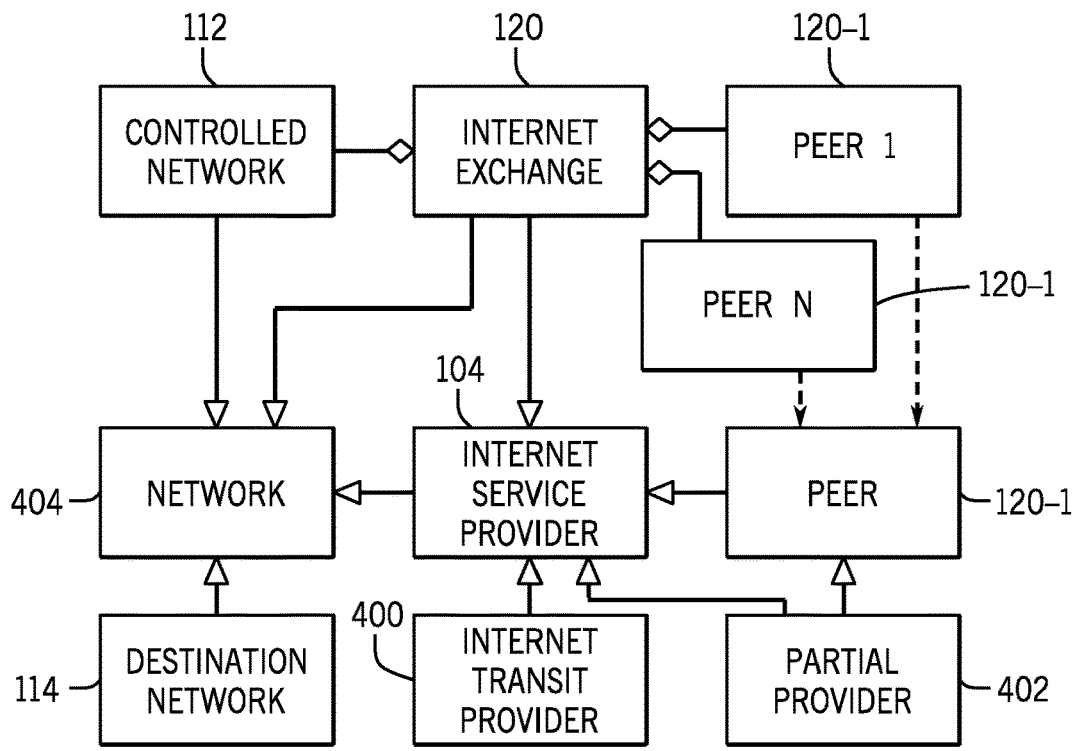
FIG. 4 illustrates a block diagram depicting the classes and relationships of Internet service providers distinguished by the network controller of FIG. 1 in order to make optimization decisions over a controlled network.

FIG. 4 illustrates a block diagram depicting the classes and relationships of Internet service providers distinguished by the network controller 102 in order to make optimization decisions over the controlled network 112. Specifically, controlled network 112 is the home network. Network controller 102 is aware of the constraints imposed by Internet exchanges 120 and partial providers 402. Network controller 102 therefore is used to optimize controlled network 112. (Although shown in a different configuration than in FIG. 1, peers 120-1 are on Internet exchange 120. The same is true for FIGS. 5-7.) Destination network 114 is a remote (far away) network without a direct connection to the controlled network 112. Controlled network 112 must service packets that are addressed to destination network 114. Thus, controlled network 112 must decide (select) which Internet service providers 104 to transfer those packets for further processing. In this figure, Internet service providers 104 represent the three types of service they can offer as follows.

First, Internet transit provider 400 is an Internet service provider 104 that services packets addressed to all destinations. Partial provider 402 is an Internet service provider 104 that services packets addressed to a very few destination networks. Third, Internet exchange 120 is an Internet service provider 104 that services packets addressed to peers 120-1 (networks). Two or more peers 120-1 interconnected within Internet exchange 120 (connecting diamond symbols depict this) and one of the interconnected peers 120-1 is the controlled network 112. Network 404 represents a network generally (used for purposes of this diagram) that may represent some or all of these Internet Service Providers.

Figure 5:
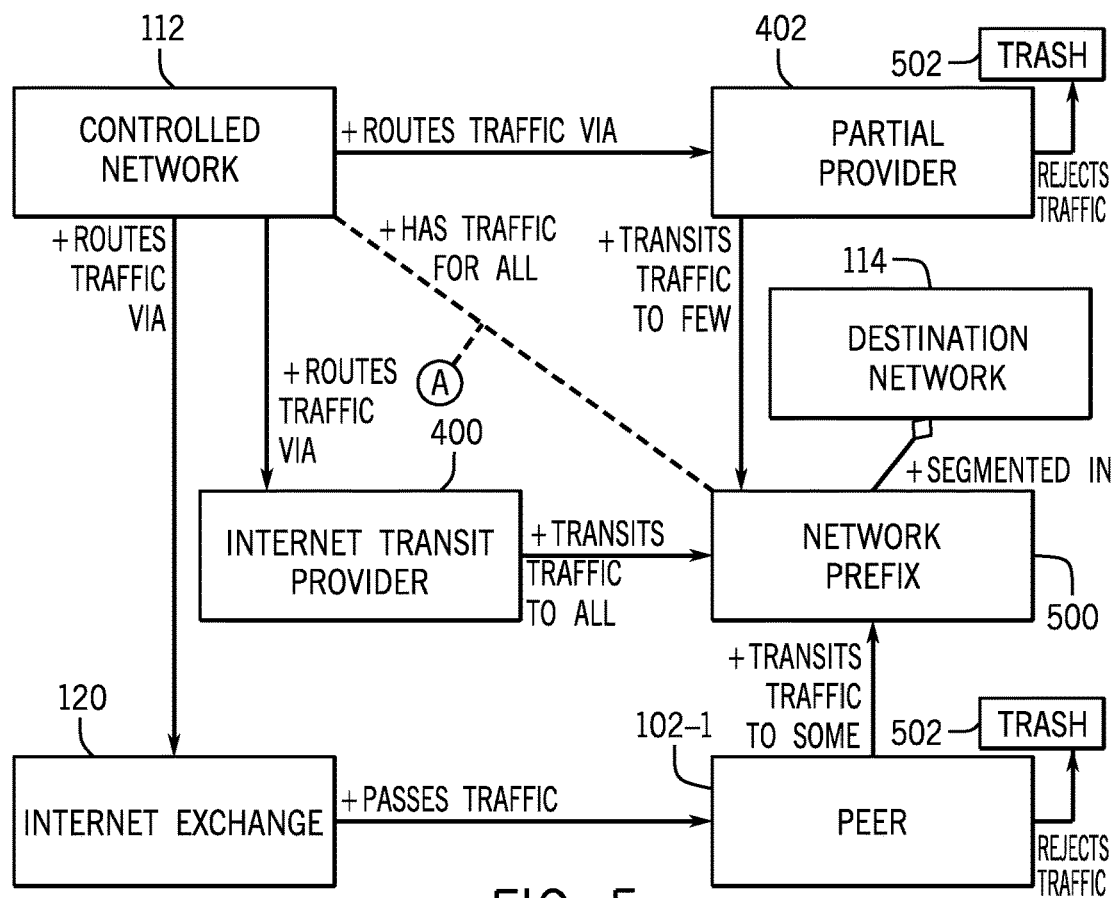
FIG. 5 illustrates the different re-routing options available when making optimization decisions in multi-homed networks.

FIG. 5 illustrates the different options available when making optimization decisions in multi-homed networks. The ultimate goal is to route all packets to network prefix 500 of destination network 114. This is identified by dotted line A. In practice, the options for re-routing traffic via different Internet service provider 104 types are shown (i.e., partial provider 402, Internet transit provider 400, Internet exchange 120). Specifically controlled network 112 must service packets addressed to destination network 114 and controlled network 112 may re-route packets via Internet transit providers 400, partial providers 402 or Internet exchanges 120. At the same time partial providers 402 and Internet exchange peers 120-1 might drop the packets if they are routed incorrectly. So, in order to re-route packets addressed to a specific network prefix, a network controller 102 must evaluate if partial providers 402 and Internet exchange peers 120-1 will service the packets if re-routed via provider interfaces 108 (linked to them) before deciding to probe those destinations and eventually re-route that traffic. As shown, certain peers 120-1 that do not service destination 114 discard packets directed toward it (trash 502).

Figure 6:
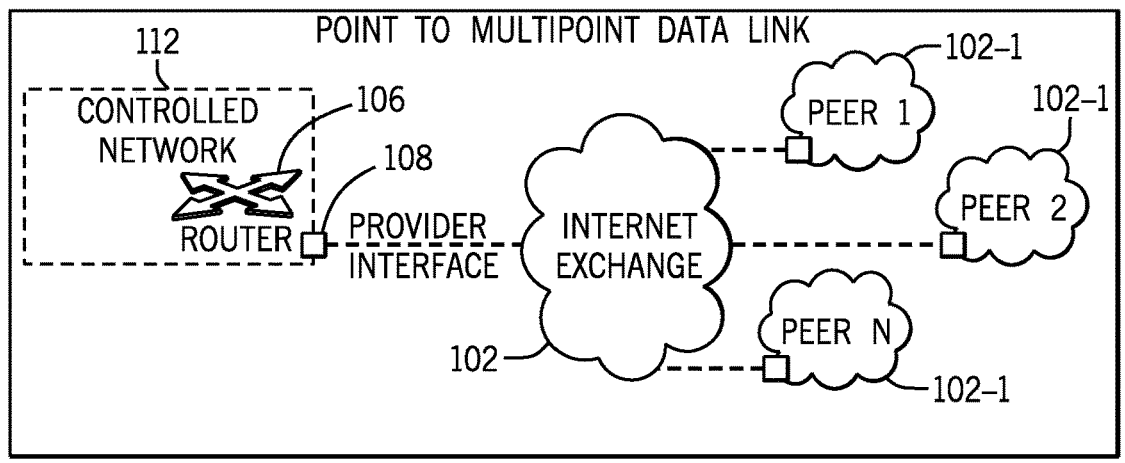
FIG. 6 illustrates a point to multipoint data link configuration wherein an Internet exchange represents point to multipoint connections.

FIG. 6 illustrates a point to multipoint data link configuration wherein an Internet exchange represents point to multipoint connections. In a point to point medium for example, it is sufficient to identify the provider interface 108 where the packets are dispatched. Once the packet reaches the designated sending provider interface 108 it automatically reaches the intended Internet service provider for further processing. Examples of point to point configurations are point-to-point protocol (PPP) or high-level data link control (HDLG) as known by those skilled in the art. In a point to multipoint configuration as shown in FIG. 6, controlled network 112, besides identifying the designated provider interface 108, must also mark a packet with the intended peer 120-1 that will service the packet. This marker is used by the data link network to correctly deliver the packet to the intended Peer 120-1 for further processing. Examples of point to multipoint configurations are Ethernet or Frame Relay as known to those skilled in the art. Transit providers 400 and partial providers 402 can be viewed as interconnecting over point to point data links while Internet exchanges 120 represent a point to multipoint data link network between peers 120-1.

Figure 7:
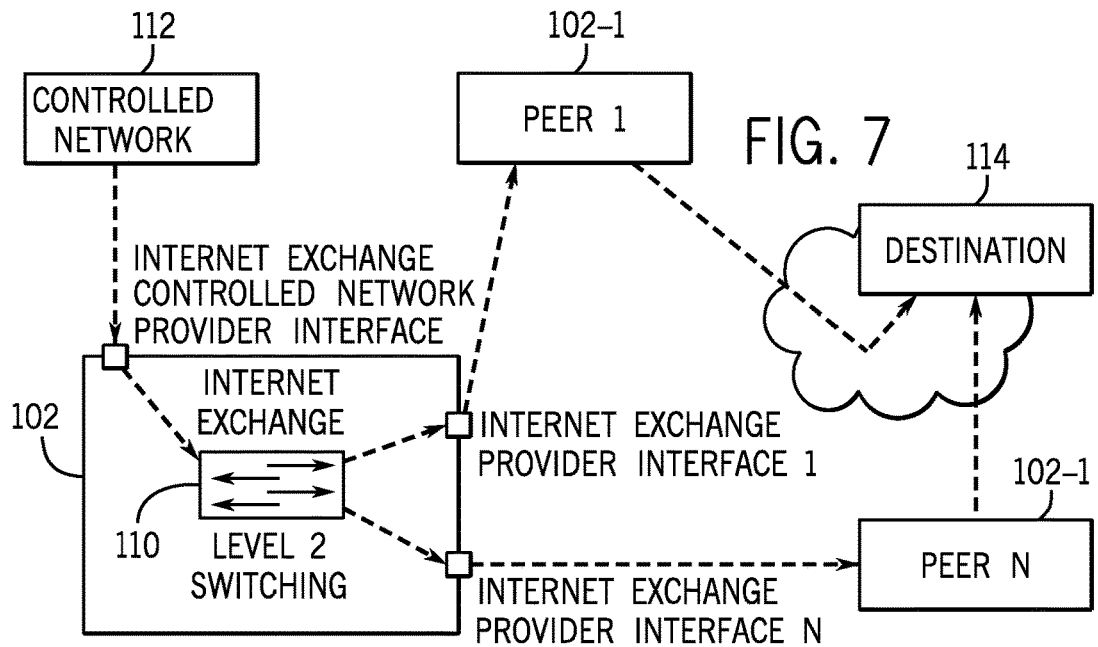
FIG. 7 illustrates an example network configuration where two or more peers on an Internet exchange can service a particular destination network prefix.

FIG. 7 illustrates an example network configuration where one or more peers on an Internet exchange can reach a particular destination network prefix. That is, multiple peers 120-1 on Internet exchange 120 can route packets to a specific destination network prefix. This situation appears when packets addressed to destination network 114 can be serviced by a plurality of peers 120-1 (peer 1, peer N). It is clear from the diagram that the characteristics of the routes starting from Internet exchange provider interfaces 1 and N and up to destination network 114 are different. Under these circumstances, controlled network 112 considers one of them more preferable than the others to service packets. In order to decide the preferred path for packet transport, probing is performed by network controller 102 to take reliable measurements of all alternative routes and use these results to establish preference routing in accordance with an embodiment of the disclosure (as described in more detail below).

Later on, in case network controller 102 implements a re-routing decision (because it identified a better alternative to the existing policy), network controller 102 needs a mechanism to enforce the new policy. Network controller 102 uses existing route injection techniques by way of routes manager 102-1 to router 106. Network controller 102 uses (for example) Border Gateway Protocol 4 (BGP-4) as defined in the Y. Rekhter, T. Li, S. Hares, "A Border Gateway Protocol 4 (BGP-4)", IETF RFC 4271; Open the Shortest Path First (OSPF) as defined in the J. Moy, "OSPF Version 2"; IETF RFC 2328; D. Savage, D. Slice, J. Ng, S. Moore, R. White, "Enhanced Interior Gateway Routing Protocol", IETF draft-savage-eigrp-00; Command Line interface via secure shell or telnet protocol; or Serial Port or any other protocol, port or method for configuring router 106, by executing router-specific configuration commands. Further, the re-routing decision/policy is propagated between routers 106 by the dynamic routing protocols established between routers 106 used in order to apply the implementation to the controlled network 112. The newly injected route points to the IP address of the selected peer 120-1 within the Internet exchange 120 infrastructure. Further on, the routers 106 handling packets that comply with this policy will indicate at the data link level (level 2) the MAC address (media access control address) that maps with the specified IP address and thus the packets will be forwarded correctly via entire Internet exchange 120 infrastructure.

As indicated above, a mechanism is disclosed for reliable and cost-effective probing of Internet exchanges 120 in accordance with an embodiment of this disclosure. Probing is the mechanism used for sending control packets to a desired destination through all available Internet service providers 104 in order to take measurements of network performance characteristics such as latency, packet loss or jitter. Once probing is performed, probing results are used to evaluate alternative re-routing candidates and make re-routing decisions that will either improve performance or reduce costs. Probing can be done only if the edge router 106 distinguishes control packets from ordinary packets that it services. Once the edge router 106 has identified a control packet instead of applying its existing routing policy it uses a special set of policy rules to ensure that control packets exit controlled network 112 through a specific Internet provider 104.

In brief, the disclosed mechanism is based on marking probing IP packets. The marker relies on IP protocol capabilities. The solution to mark control packets as originating from specific IP addresses allocated by control network 112 is prohibitively expensive since one source IP address will be required for each peer 120-1 and large Internet exchanges 120 will require many tens or even hundreds of designated IP addresses that cannot be allocated to other network elements.

To address the above concern, the marker incorporates a combination of fields. The first element of the marker is the source IP address. The second element of the marker is the DSCP (differentiated services codepoint) field as known to those skilled in the art. (The corresponding description for DSCP, for example, is described in K. Nichols, S. Blake, F. Baker, D. Black, "Definition of the Differentiated Services Field (DS Field) in the IPv4 and IPv6 Headers", IETF RFC 2474). DSCP has been chosen since it allows 64 different values, and in conjunction with the IP address, it allows for 64 different markers that can be used to implement policies for 64 peers 120-1 on the Internet exchange 120. In case the Internet exchange 120 has additional peers, additional IP addresses shall be assigned for control packet marking purpose.

It must be noted that while the combination of source IP address and DSCP is a workable solution in the case of Internet exchanges 120, the combination may not work reliably for Internet transit providers 400 as known to those skilled in the art. In the case of Internet exchanges 120, a single IP is used as source IP and usually only one (or very rarely two or three) peer 120-1 service a specific destination network 114. When probing a destination network 114, the network controller 112 will generate many control packets addressed to that destination network 114. If too many of the control packets originate from a single IP address, destination network 114 might enforce rate control limitations and intentionally drop control packets. Such a situation is not desirable. So therefore, network controller 102 is configured to ensure that not too many probing packets addressed to a specific destination originate from a single source IP address as known to those skilled in the art.

Further, in accordance with the embodiment of this disclosure, a mechanism is used to configure Internet exchange peers 120-1 automatically. In this embodiment, the markers are communicated and implemented on controlled network 112 and routers 106 in the form of textual file policies. The rules of these policies instruct the edge router 106 how to identify such a marker within control packets and determine the peer 120-1 on the Internet exchange 120 to which packets should be forwarded. The method automatically assigns marker values to all identified peers 120-1 on the Internet exchange 120 and generates a policies file. The auto-assigned values and the auto-generated policy files are subsequently applied on the relevant routers 106 in controlled network 112 by a human operator. It shall be pointed out that changes to auto-assigned markers, enabling and disabling of peers 120-1 should be made before generating the policies file. This ensures that both the controlled network 112 and network controller 102 use a set of identical rules. In this way miscommunication is avoided. If changes to markers and policies are subsequently made or if a new auto-configuration step is employed, then the old policies on the edge routers 106 of the controlled network 112 shall be discarded and the new (current) set of policy rules shall be extracted and re-applied. This is described below with respect to FIGS. 8-10.

Figure 8:
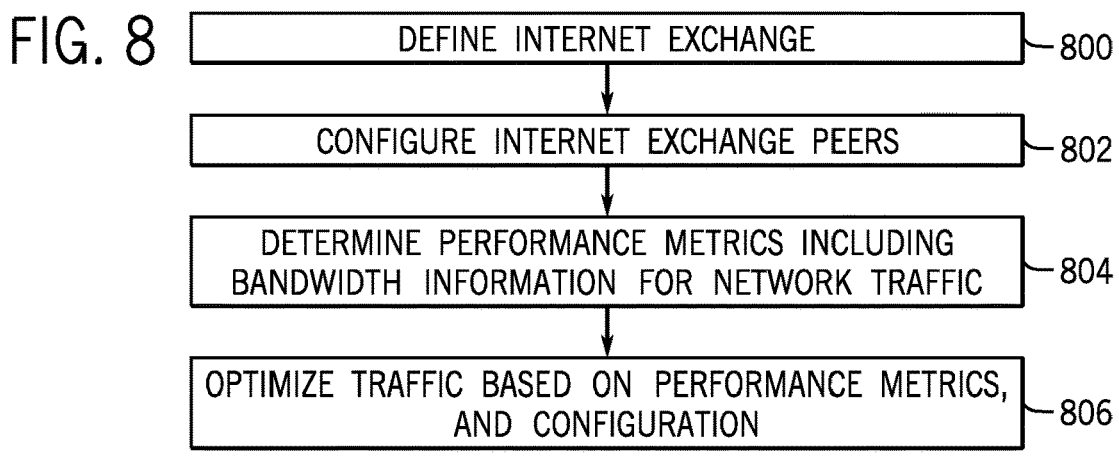
FIG. 8 illustrates is a high-level example flow diagram of a system for optimizing traffic in packet-switched networks in the presence of an Internet exchange.

FIG. 8 illustrates is a high-level example flow diagram of system 100 for optimizing traffic in packet-switched networks in the presence of an Internet exchange. (System 100 essentially provides an intelligent platform for performing this optimization.) In particular, execution begins at step 800 wherein an Internet exchange is defined. In this respect, the IP addresses are provided and the Internet exchange is identified.

Next, execution moves to step 802 wherein Internet exchange peers are configured. In this respect, network controller 102 reviews the entire routing tables and identifies peers on the Internet exchange (based on details of that Internet exchange) and their serviced destination networks 114. Network controller 102 then updates the configuration in central repository (i.e., assigns the markers to be used by all selected peers and persists the network prefixes serviced by all selected peers). A human operator will extract the markers and apply them to the routers to ensure that network explorer 102-2 sends control packets to correct peers. (This is performed once to set up environment).

Execution then moves to step 804 wherein network controller 102 determines performance metrics for the network including bandwidth information of network traffic. In this respect, routing information is updated about network destinations serviced by the peers. As part of this, information is extracted from the router 106 and stored in central repository 102-4 of network controller 102. Then, peers that service destination network are probed. Network controller 102 sends control packets to these peers (targeting destination network 114). Network controller 102 receives acknowledgement from destination network 114 that the control packets were received and the time elapsed for such receipt.

Execution then moves to step 806 wherein the traffic is optimized based on the performance metrics and configuration in step 802. In this respect, traffic (packets) may be re-routed from an Internet transit provider to an Internet exchange or from an Internet transit provider to another.

FIG. 8 is broken down in detail in FIGS. 9 and 10 below.

Figure 9:
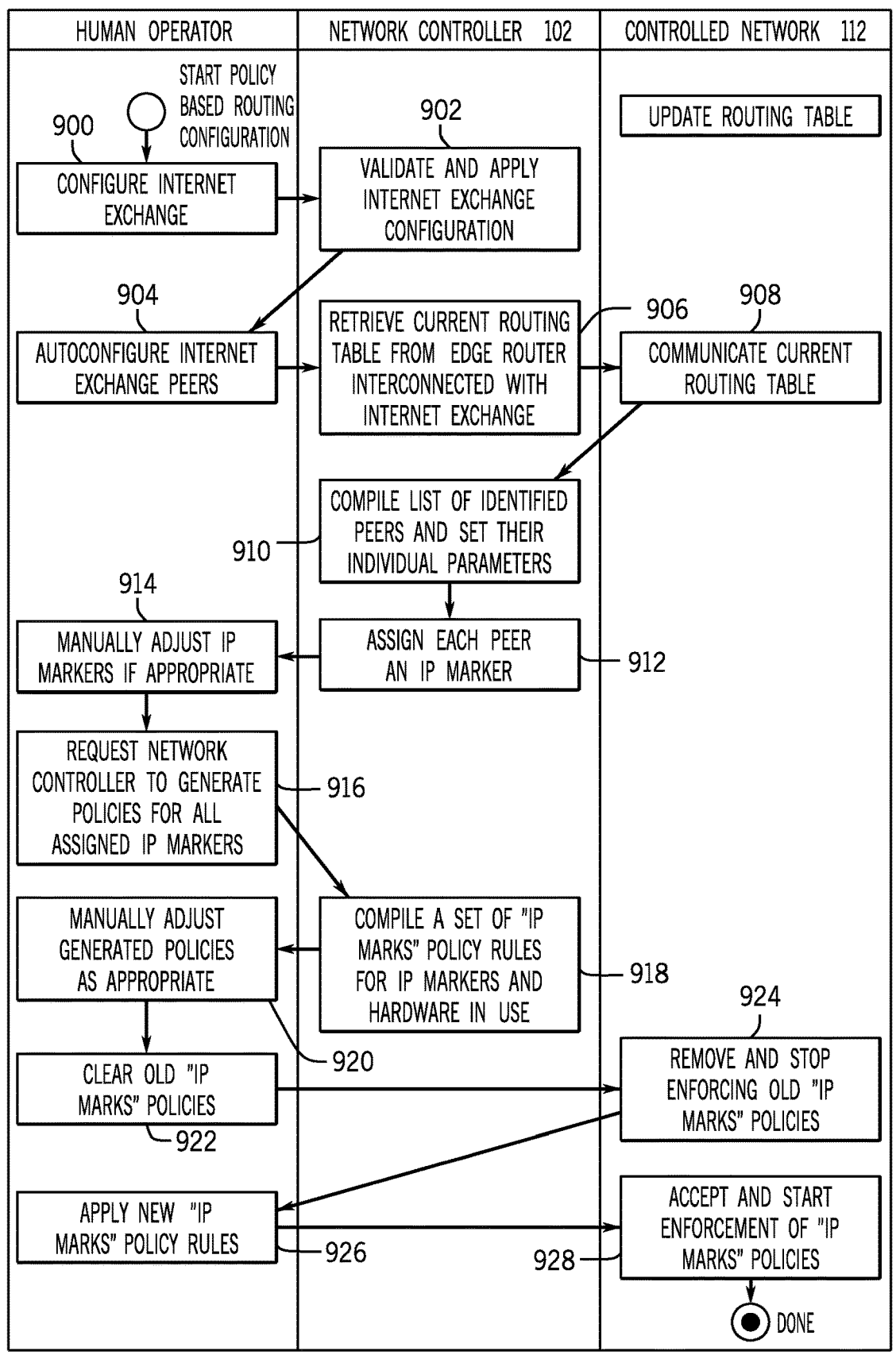
FIG. 9 illustrates a detailed example flow diagram for policy based routing configuration of a controlled network and network controller to measure performance characteristics via all peers on the Internet exchange.

FIG. 9 illustrates a detailed example a flow diagram for policy based routing configuration of controlled network and network controller to measure performance characteristics via all peers on the Internet exchange. Note that the flow steps in FIG. 9 are positioned under one of three columns to identify the application/module or entity that actually performs the steps in this embodiment. It is also noted that controlled network 112 is continuously updating routing tables that will be retrieved for executing the steps in FIG. 9.

Now, execution begins at steps 900 wherein human operator configures the Internet exchanges 120 that connects with controlled network 112. Human operator can use the frontend 103-5 of the network controller 102.

Execution moves to step 902 wherein network controller 102 validates if the Internet exchanges configuration includes correct values for all required Internet exchange configuration attributes and stores the configuration in central repository 102-4. Execution then moves to step 904 wherein the human operator initiates auto-configuration of peers. (The human operator shall take into consideration the individual edge router capabilities and available processing capacities at step 904. The human operator is advised that the process can take a significant amount of time.)

Execution moves to step 906 wherein network controller 102 retrieves a current routing table from edge router 106 (interconnected directly with the Internet exchange 120). Routing table is retrieved using BGP protocol but other protocols may be used as known to those skilled in the art. It shall be noted that the operation is costly from the perspective of edge router 106. Execution moves to steps 908 and 910 wherein controlled network 112 communicates the required routing table to network controller 102 and network controller 102 extracts the details of each peer 120-1 that interconnects with the Internet Exchange 120 and also the network prefixes serviced by each of the peers 120-1. Network controller 102 stores peer configurations in central repository 102-4 so that the number of subsequent requests for this information is reduced and the load on the edge routers 106 is minimal. (Steps 906-910 essentially retrieve the configuration from the controlled network router that relates to the Internet exchange including existing peers and peer serviced networks).

Execution moves to step 912 wherein network controller 102 assigns "IP markers" to the individual peers 120-1 (to distinguish such peers 120-1). The markers use a combination of source IP address and DSCP in order to support a large number of peers 120-1 that interconnect on large Internet exchanges 120. One IP address is required to distinguish up to 64 peers 120-1. Additional IP addresses are required to support hundreds of peers on very large Internet exchanges. The assigned IP markers are stored in central repository 102-4.

Execution moves to steps 914 and 916 wherein the human operator can review and adjust the automatically assigned IP markers and the human operator, aware of the type of hardware used on the controlled network 112, requests that network controller 102 generate the policies with all the assigned IP markers, respectively. (Steps 914-916 essentially reviews IP markers automatically assigned by the traffic controller 102-3 via frontend 102-5).

Execution then moves to step 918, wherein network controller 102 then produces policies with all the assigned IP markers for requested hardware. For easy reference to these policies, "IP marks" is used to identify all of the policy rules. (However, those skilled in the art know that the policy rules may be identified using other terms.) The format and capabilities of different edge router 106 hardware are different, and as such, the resulting policies texts are also different.

Execution moves to steps 920 and 922 wherein the human operator reviews the produced policies and makes adjustments if required and instructs the controlled network 112 to discard old IP marks policies if they have been added in the past and already exist. Then, controlled network 112 discontinues enforcing and discards old IP marks policies at step 924. (Steps 918-924 essentially manually applies the policy based routing (PBR) to the controlled network routers.)

Execution them moves to step 926 wherein the human operator instructs controlled network 112 to load and start enforcing new IP marks policies, and at step 928, controlled network 112 loads and starts enforcing new IP marks policies.

At this stage, controlled network 112 is ready to start measuring (probing) through all active Internet exchange peers 120-1 and also to route traffic through intended Internet exchange peers 120-1. This process can be repeated for other Internet exchanges 120 that connected to controlled network 112. The process starting with step 904 can be used to refresh the IP markers that add support for new peers 120-1 that connect with the Internet exchange 120 since the last Internet exchange configuration took place.

In accordance with another embodiment of the disclosure, a mechanism is disclosed for an adjusted decision-making process for Internet exchanges 120. Once controlled network 112 is capable of enforcing routing rules based on IP markers, probing through specific Internet exchange peers 120-1 and re-routing of controlled network 112 traffic through a specific Internet exchange peer 120-1 becomes possible. Re-routing of traffic offers some benefits to the controlled network 112 in the form of either improved performance, reduced costs or balanced network capabilities use.

Turning to FIGS. 10A-10D illustrates a detailed flow diagram for re-routing decision making in the presence of Internet exchanges. In brief, the flow in FIG. 10A-10D focuses on the adjusted decision-making process that determines if packets addressed to a specific destination 114 network prefix are re-routed from their original routing policies. In such an environment, it is mandatory that the network controller 102 continuously refreshes its internal decision tables so that these represent accurate and current capabilities of the partial provider 402 and the peers 120-1 on the Internet exchange 120. The flowchart focuses on the steps in which the network controller 102 undertakes that allow it to make proper decisions regarding Internet traffic re-routing from original routes towards alternative candidates with improved characteristics.

Figure 10A:
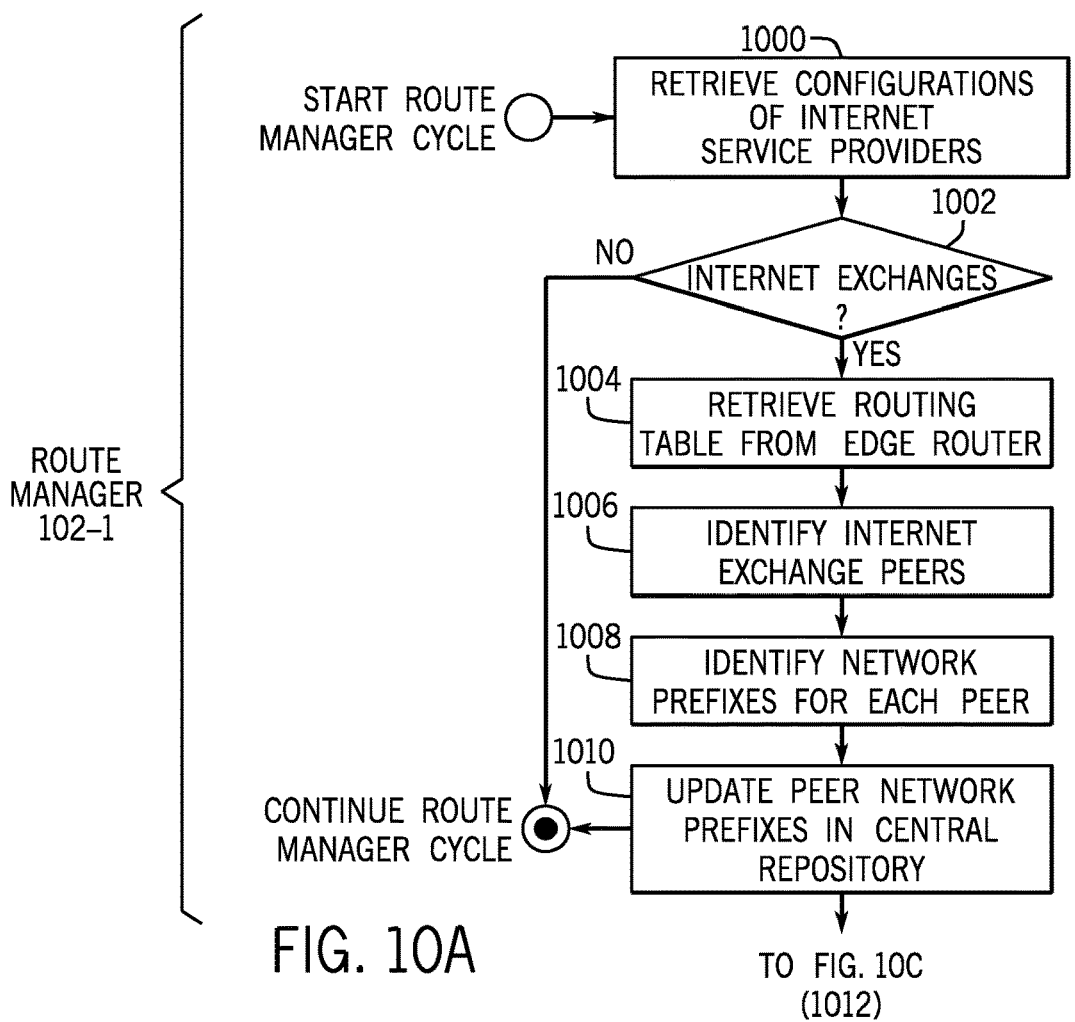
FIGS. 10A-10D illustrate a detailed flow diagram for re-routing decision making in the presence of Internet exchanges.
Figure 10B:
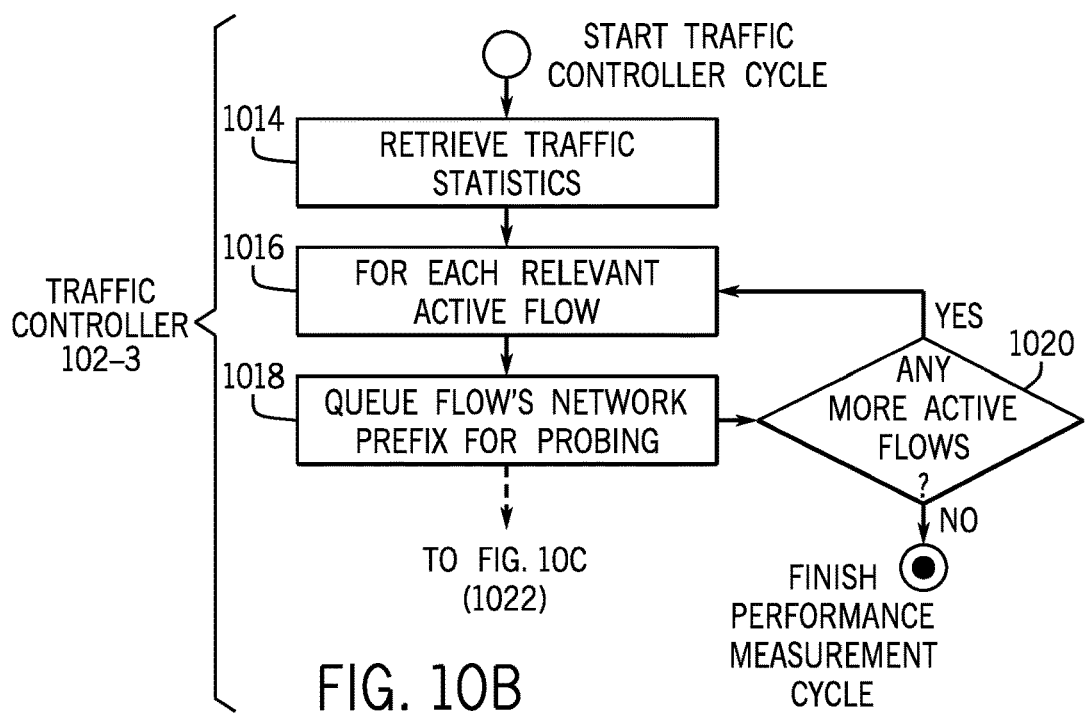
Figure 10C:
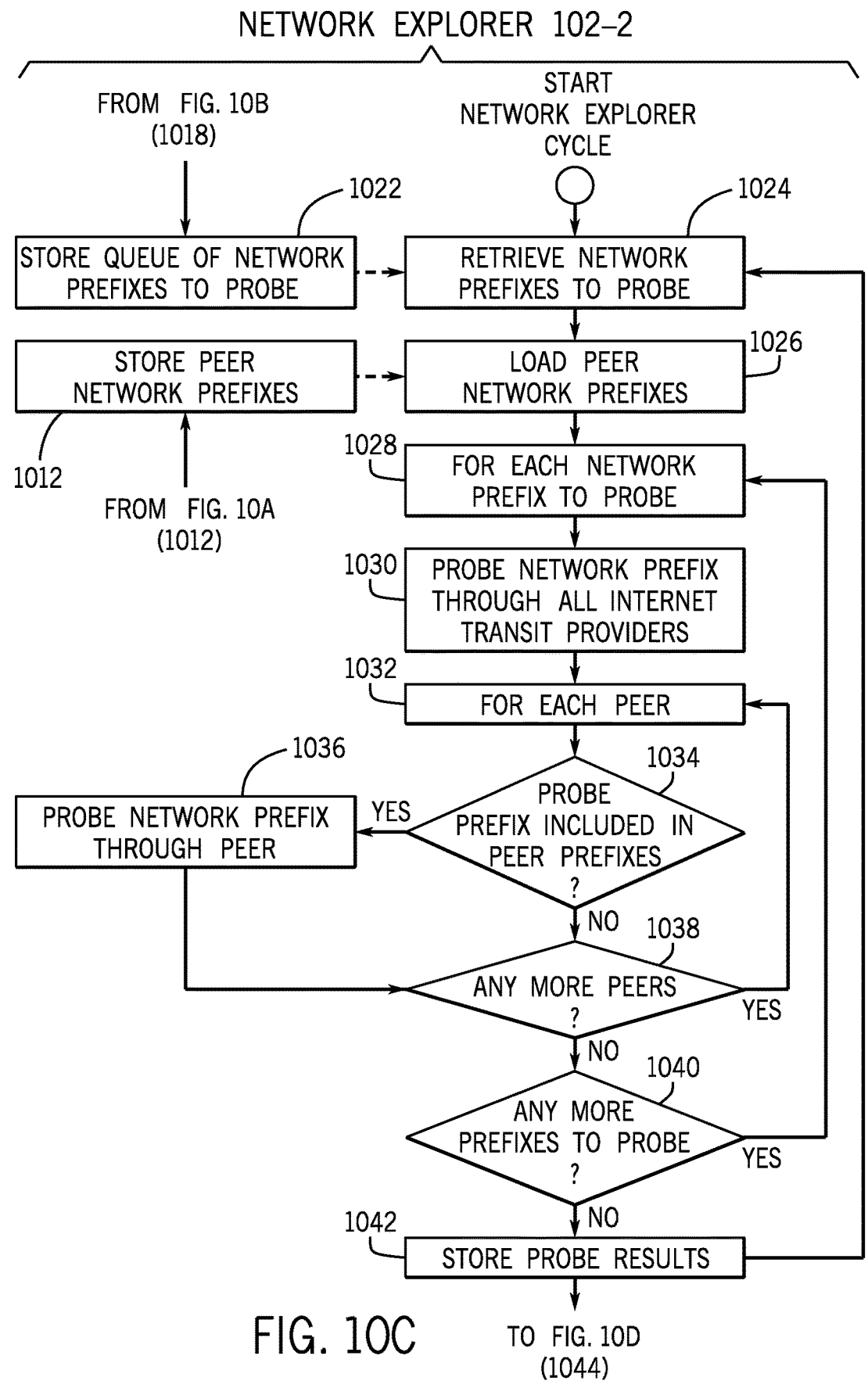

In detail, the diagram in FIG. 10A-10D depicts the application flows performed by routes manager 102-1 (FIG. 10A), traffic controller 102-3 (FIGS. 10B and 10D) and network explorer 102-2 (FIG. 10C). The flows for these modules are interrelated yet they function separately. See the details below. The discussion will begin with the flow in FIG. 10A, but will continue across FIGS. 10B-D as needed.

The process starts when routes manager 102-1 periodically initiates a designated Internet exchange refresh cycle that synchronizes an Internet exchange peer configuration from controlled network 112. The periodicity is set at one hour but it can be adjusted. The cycle frequency (periodicity) must balance the additional load on the edge router 106 (by the synchronization process) against the rate peer 120-1 configuration changes (i.e., configuration may get outdated or stale).

Execution moves to step 1000 wherein routes manager 102-1 retrieves active Internet service provider 104 configurations from central repository 102-4. The Internet service providers 104 may include Internet exchanges, Internet transit providers, and partial providers.

Execution moves to decision step 1002 wherein it is determined if the Internet service provider 104 is an Internet exchange. If so, an Internet exchange refresh cycle is performed. Other types of Internet service providers 104 do not undergo such a refresh cycle and are skipped. If it is an Internet exchange, then execution moves to step 1006.

In step 1004, routes manager 102-1 communicates with the edge router 106 where the Internet exchange 120 connects with controlled network 112 and retrieves fresh routing table data.

Execution moves to steps 1006 and 1008 wherein routes manager 102-1 identifies only the data that refers to peers 120-1 on this Internet exchange 120 and specifically network prefixes that can be routed (serviced) through each of them, respectively.

Execution moves to steps 1010 and 1012 (FIG. 10B) wherein routes manager 102-1 updates peer network prefixes data and stores it in central repository 102-4 and continues with its other routes management duties.

With respect to FIG. 10B, the traffic controller also starts a performance measurement cycle. Execution begins at step 1014 wherein traffic controller 102-3 as part of its ordinary route optimization cycles retrieves traffic statistics from controlled network 112. These statistics are needed to make decisions what prefixes to probe next. Execution moves to steps 1016 and 1018 wherein for each relevant active flow, traffic controller 102-3 queues relevant network prefixes for probing. The decision to queue a specific network prefix for probing is based on different criteria like volume of traffic, number of packets, VIP destination, etc. These considerations, however, are not relevant for the Internet exchange decision-making process. If there are no more active flows at step 1020, traffic controller 102-3 then stores the queued network prefixes in central repository 102-4 for subsequent use by network explorer 102-2 at step 1022. If there are no more active flows (decision step 1020), then the process continues to step 1024 in FIG. 10C.

With respect to FIG. 10C, network explorer 102-2 starts its cycle. Thus, execution begins at steps 1024 and 1026 wherein network explorer 102-2, as part of its continuous processing cycle, retrieves the prefixes queued for probing from central repository 102-4 and loads all network prefixes that can be serviced by peers 120-1 on Internet exchange 120.

Execution moves to steps 1028 and 1030 wherein network explorer 102-2 considers all network prefixes that will be probed and network explorer 102-2 initiates probing of network prefix via transit providers 400.

Execution moves to steps 1032 1034 (and 1038) wherein network explorer 102-2 examines all peers 120-1 on Internet exchanges 120. Specifically, a decision will be made if those peers 120-1 can service the examined network prefix. If a peer 120-1 is capable of servicing the network prefix, execution moves to step 1036 wherein network explorer 102-2 also probes the identified peer 120-1. Network explorer 102-2 ensures that a peer designated IP marker is used. If the peer 120-1 is not capable of servicing the network prefix, execution moves to step 1038 wherein it is determined if there are other peers 120-1 that might be able to service the examined network prefix.

If there are, execution returns to step 1032 wherein network explorer examines the other peers. If not, execution moves to step 1038 wherein it is determined if there are any more peers. If there are no more peers at step 1038, execution moves to step 1040 wherein it is determined if there are any more prefixes to probe. If there are other network prefixes to probe, then network explorer 102-2 returns to step 1032.

If there are no more prefixes to probe, execution moves to step 1042 wherein network explorer 102-2 identifies the probing results that are ready and stores them in central repository 102-4. Network explorer 102-2 also continues processing from step 1024 on a continuous basis.

Figure 10D:
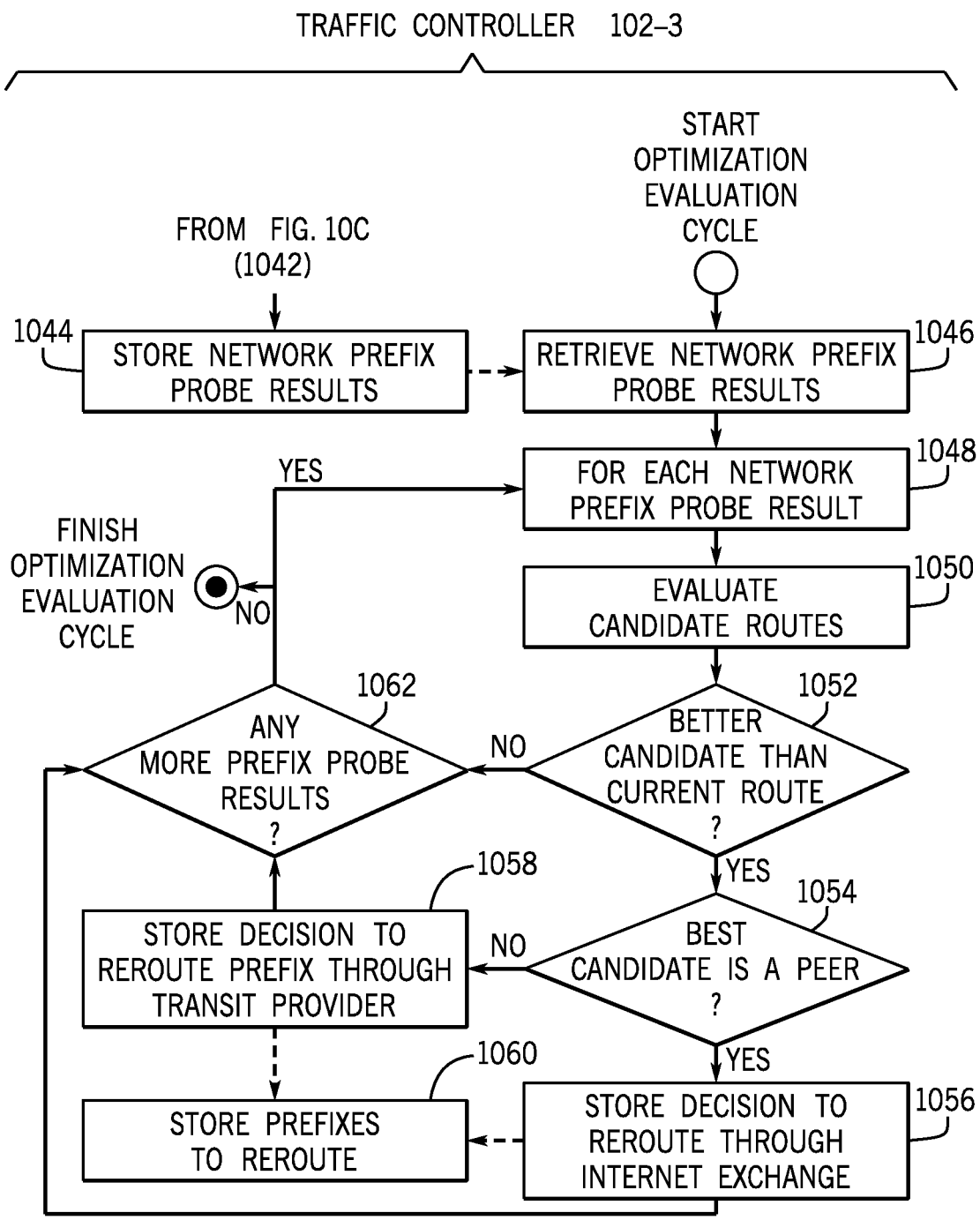
Figure 11:
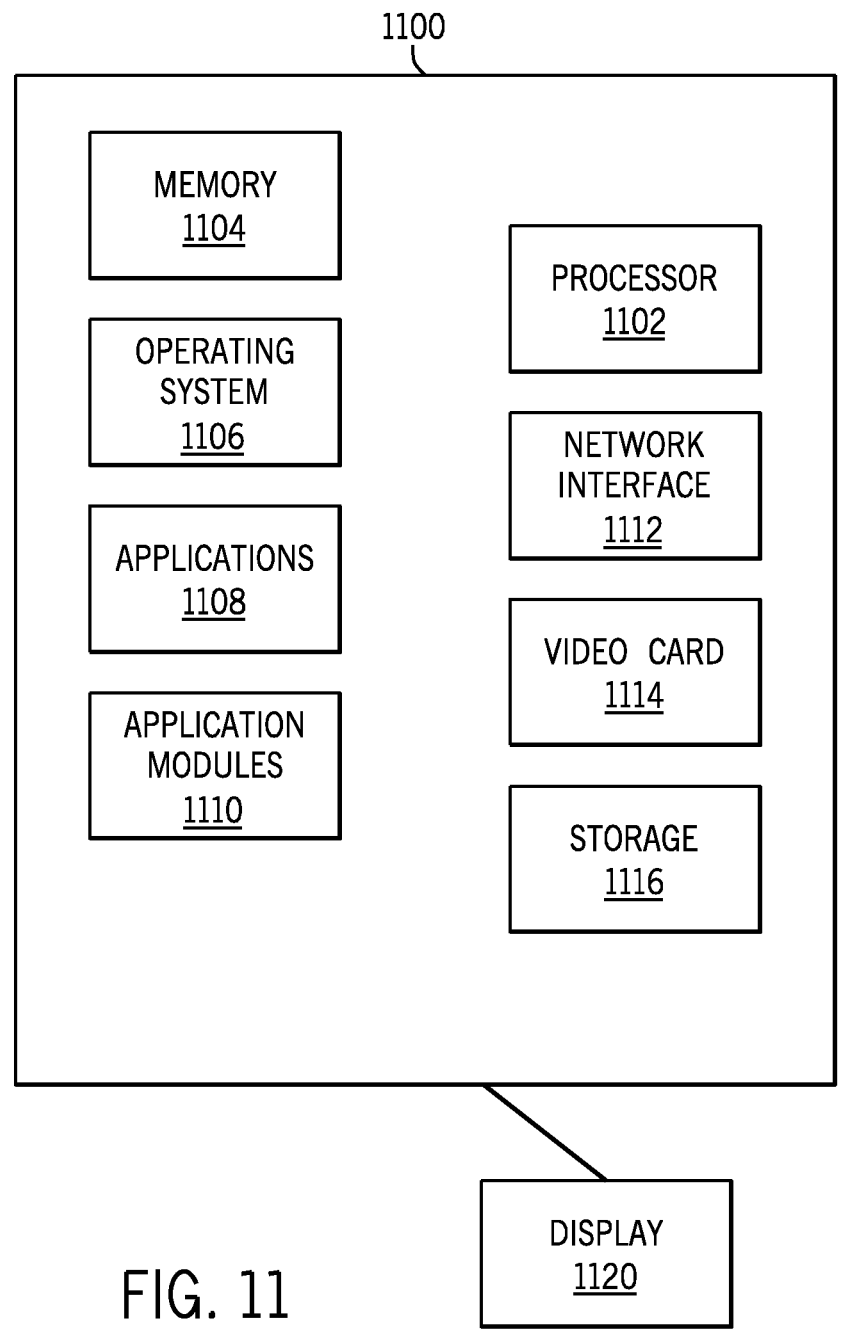
FIG. 11 illustrates a block diagram of a general-purpose computer to support the embodiments of the systems and methods including the computer program modules disclosed in this application.

Turning to FIG. 10D, execution continues to steps 1044 and 1046 wherein traffic controller 102-3, at this stage, retrieves (1046) any complete probing results stored by network explorer 102-2 in central repository 102-4.

Execution moves to steps 1048 and 1050 wherein traffic controller 102-3 examines each network prefix probing results and considers any of the successful probe result as a candidate re-routing decision and evaluates each of them with existing route performance, respectively.

Execution moves to steps 1052 and 1054 wherein if traffic controller 102-3 identifies a better candidate and the best candidate is peer 120-1 on Internet exchange 120, then traffic controller 102-3 creates a decision to re-route through Internet exchange 120. At step 1056, the decision to re-route through Internet exchange 120 is stored in central repository 102-4. At step 1052, if traffic controller 102-3 identifies a better candidate and the best candidate is Internet transit provider 400, then traffic controller 102-3 creates a decision to re-route through transit providers 400. At step 1058, the decision to reroute the prefix is stored in central repository 102-4 and the prefixes to re-route are also stored at step 1060. (Actual re-routing will be based on these decisions. Re-routing will then be effected, but it is not shown in FIG. 10D.)

If at decision step 1062, there are other network prefix probing results to process, then traffic controller 102-3 continues processing them at step 1048. If there are no other network prefix probing results to process, then traffic controller 102-3 finishes this optimization cycle and will restart another cycle soon. The new cycle is configured to start in one minute, but this value is configurable. At this point, route manager 102-1 announces the new routes on controlled network 112.

FIG. 16 illustrates a block diagram of a general-purpose computer 1100 to support the embodiments of the systems and methods disclosed in this application. In a particular configuration, computer 1100 may be a computer server as described above that is configured to enable part or all of the execution of the computer program modules (software) or application steps in the embodiments disclosed above. The computer 1100 typically includes at least one processor 1102 and system memory 1104 (volatile RAM or non-volatile ROM). The system memory 1104 may include computer readable media that is accessible to the processor 1102 and may include instructions for execution by processor 1102, an operating system 1106 and one or more application platforms 1108, such as Java and one or more modules/software components/applications 1110 or parts thereof. The computer will include one or more communication connections such as network interfaces 1112 to enable the computer to communication with other computers over a network, storage 1116 such as a hard drives, video cards 1114 and other conventional components known to those skilled in the art. This computer 1100 typically runs Unix or Microsoft as the operating system and include TCP/IP protocol stack (to communicate) for communication over the Internet as known to those skilled in the art. A display 1120 is optionally used.

It is to be understood that the disclosure teaches examples of the illustrative embodiments and that many variations of the invention can easily be devised by those skilled in the art after reading this disclosure and that the scope of the present invention is to be determined by the claims below.

We claim:

1. A system for optimizing Internet traffic on a computer network, the system including one or more servers that are configured to communicate with a destination network through one or more Internet service providers and one or more routers on the computer network, the one or more servers configured to execute computer programs steps, the computer program steps comprising:

retrieving configurations of the one or more Internet service providers, including one or more Internet transit providers:

identifying an Internet exchange from the configurations of the one or more Internet service providers;

retrieving a routing table from an edge router, of the one or more routers, that is configured to communicate with the Internet exchange identified:

identifying one or more peers on the Internet exchange, based on the routing table, that provide Internet service to the destination network;

identifying network prefixes carrying Internet traffic that can be routed through the one or more peers on the Internet exchange;

determining performance metrics of the one or more peers on the Internet exchange to identify at least one peer of the one or more peers on the Internet exchange to which the network prefixes may be re-routed; and determining if the network prefixes will be re-routed through the at least one peer of the one or more peers on the Internet exchange based on the performance metrics.

2. The system of claim 1 wherein determining the performance metrics includes probing the one or more peers.

3. The system of claim 1 wherein probing includes:
sending control packets to the destination network through the one or more peers that provide Internet service to the destination network; and
receiving acknowledgement from the destination network that the control packets were received along with time elapsed.

4. The system of claim 1 wherein determining the performance metrics includes measuring bandwidth information of the network.

5. The system of claim 1 wherein the computer program steps further comprise:
re-routing the network prefixes to the at least one peer based on the performance metrics of that peer.

6. The system of claim 5 wherein re-routing includes re-routing the network prefixes from an Internet transit provider to the at least one peer of the Internet exchange.

7. The system of claim 1 wherein the computer program steps include defining the Internet exchange.

8. The system of claim 1 wherein configuring further includes assigning IP markers to the one or more peers identified, wherein the assigned IP markers each include an IP address and DSCP (differentiated services codepoint) for each peer of the one or more peers.

9. The system of claim 8 wherein configuring further includes compiling a set of IP marks policy rules for the IP markers with respect to the one or more routers on the computer network.

10. The system of claim 9 wherein configuring further includes applying the set of IP marks policy rules to the one or more routers on the computer network.

11. A system for optimizing Internet traffic on a computer network including one or more Internet service providers that are configured to communicate with a destination network, the system including one or more servers configured to execute computer programs steps, the computer program steps comprising:
(a) retrieving configurations of the one or more Internet service providers and identifying an Internet exchange from the configurations of the one or more Internet service providers;
(b) retrieving a routing table from a network router that is configured to communicate with the Internet exchange and identifying one or more peers on the Internet exchange based on the routing table that provide Internet service to the destination network;
(c) assigning IP markers to the one or more peers on the Internet exchange;
(d) identifying network prefixes carrying Internet traffic that are subject for probing;
(e) determining if the one or more peers on the Internet exchange provide Internet service to any of the identified network prefixes;
(f) probing the network prefixes through one or more Internet transit providers to determine performance metrics through the Internet transit provider;
(g) probing the network prefixes via one or more peers on the Internet exchange determined to service the destination network to determine performance metrics through the one or more peers;
(h) retrieving results of probing the network prefixes and evaluating candidate routes associated with the network prefixes serviced by the one or more peers on the Internet exchange for the Internet traffic and selecting a candidate route that has the best performance metrics, wherein the candidate route is a peer on the Internet exchange; and
(i) determining whether to re-route the Internet traffic via the peer on the Internet exchange or an Internet transit provider of the Internet transit providers.

12. The system of claim 11 wherein the computer program steps further comprise re-routing the Internet traffic via the peer on the Internet exchange.

13. The system of claim 12 wherein the computer program steps further comprise identifying one or more candidate routes associated with the network prefixes with performance values that do not exceed a threshold in degrading performance.

14. The system of claim 13 wherein the performance values are based on packet loss, latency, and/or jitter.

15. The system of claim 12 wherein evaluating network prefixes having candidate routes for the Internet traffic is based on costs.

16. The system of claim 11, the computer program steps further comprise storing a decision to re-route traffic via the candidate route having the best performance value.

17. The system of claim 11 wherein probing the network prefixes via the determined peer includes applying the IP marker associated with that determined peer, wherein the IP marker includes an IP address and DSCP (differentiated services codepoint) for each peer of the one or more peers.

18. A method of optimizing Internet traffic on a computer network, the method implemented in one or more servers that are configured to communicate with a destination network through one or more Internet service providers, the method comprising:
retrieving configurations of the one or more Internet service providers from a central repository, including one or more Internet transit providers:
identifying an Internet exchange from the configurations of the one or more Internet service providers;
retrieving a routing table from an edge router, of the one or more routers, that is configured to communicate with the Internet exchange identified:
identifying one or more peers on the Internet exchange based on the routing table;
periodically updating data relating to any of the one or more peers on the Internet exchange that provide Internet service to the destination network;
measuring performance characteristics of the one or more peers on the Internet exchange;
monitoring Internet traffic at a first provider interface and determining if some or all of the Internet traffic will be re-routed through a second provider interface having better performance or cost characteristics for the Internet traffic than the first provider interface;
determining if the re-routed traffic will be routed through the one or more peers on the Internet exchange; and
re-routing the Internet traffic from the first provider interface to the second provider interface having better performance or cost characteristics than the first provider interface.

19. A non-transitory computer readable medium storing a computer program for providing a method of optimizing Internet traffic on a computer network, the method implemented in one or more servers that are configured to communicate with a destination network via one or more Internet service providers and one or more routers on the computer network, the computer program comprising instructions, which when executed by the one or more servers, cause the one or more servers to:
retrieve configurations of the one or more Internet service providers including one or more Internet transit providers;

identify an Internet exchange from the configuration of the one or more Internet service providers;

retrieve a routing table from an edge router that is configured to communicate with the Internet exchange through the edge router;

identify one or more peers on the Internet exchange based on the routing table, that provide Internet service to the destination network;

identify network prefixes that carry Internet traffic that can be routed through the one or more peers on the Internet exchange;

determine performance metrics of the one or more peers on the Internet exchange to identify at least one peer of the one or more peers of the Internet exchange to which the network prefixes may be re-routed; and determine if the network prefixes for the destination network will be re-routed through the at least one peer of the one or more peers of the Internet exchange based on the performance metrics.

* * * * *